(12) United States Patent
Min

(10) Patent No.: US 12,284,543 B2
(45) Date of Patent: Apr. 22, 2025

(54) METHOD AND DEVICE FOR MEASURING FREQUENCY IN 5G COMMUNICATION SYSTEM

(71) Applicant: Samsung Electronics Co., Ltd., Suwon-si (KR)

(72) Inventor: Byoungyoon Min, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 17/767,404

(22) PCT Filed: Oct. 12, 2020

(86) PCT No.: PCT/KR2020/013869
§ 371 (c)(1),
(2) Date: Apr. 7, 2022

(87) PCT Pub. No.: WO2021/071338
PCT Pub. Date: Apr. 15, 2021

(65) Prior Publication Data
US 2023/0057211 A1    Feb. 23, 2023

(30) Foreign Application Priority Data
Oct. 11, 2019  (KR) .......................... 10-2019-0126207

(51) Int. Cl.
*H04W 24/10* (2009.01)
*H04W 56/00* (2009.01)
*H04W 36/08* (2009.01)

(52) U.S. Cl.
CPC ......... *H04W 24/10* (2013.01); *H04W 56/001* (2013.01); *H04W 36/08* (2013.01)

(58) Field of Classification Search
CPC ........................... H04W 24/10; H04W 56/001
See application file for complete search history.

(56) References Cited

U.S. PATENT DOCUMENTS

| | | |
|---|---|---|
| 11,109,255 B2 | 8/2021 | Yang et al. |
| 2018/0091212 A1 | 3/2018 | Lee et al. |
| 2019/0239106 A1* | 8/2019 | Cui ........................ H04W 24/08 |

(Continued)

FOREIGN PATENT DOCUMENTS

| | | |
|---|---|---|
| WO | 2018199653 A1 | 11/2018 |
| WO | 2019/160266 A1 | 8/2019 |

OTHER PUBLICATIONS

Samsung, "Measurement Gap Assistance Information", 3GPP TSG-RAN WG2 Meeting#101bis, Apr. 16-20, 2018, R2-1804707, 3 pages.

(Continued)

*Primary Examiner* — Derrick V Rose

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

12 Claims, 23 Drawing Sheets

(56) References Cited

U.S. PATENT DOCUMENTS

| | | | |
|---|---|---|---|
| 2021/0051618 A1* | 2/2021 | Yang | H04W 48/08 |
| 2021/0219154 A1* | 7/2021 | Han | H04B 7/0626 |
| 2021/0227413 A1* | 7/2021 | Yang | H04W 36/0069 |

OTHER PUBLICATIONS

Ericsson et al., "Draft CR 38.133 (9.1.2) Definition of Measurement Gap", Change Request, 3GPP TSG RAN WG4 Meeting #89, Nov. 12-16, 2018, R4-1816139, 9 pages.

Nokia et al., "SMTC and measurement gap timing for EN-DC", 3GPP TSG-RAN WG4#86, Feb. 26-Mar. 2, 2018, R4-1802391, 4 pages.

Supplementary European Search Report dated Oct. 4, 2022 in connection with European Patent Application No. 20 87 3462, 16 pages.

International Search Report and Written Opinion of the International Searching Authority dated Jan. 5, 2021, in connection with International Application No. PCT/KR2020/013869, 10 pages.

Ericsson, "SFTD reporting for non-configured PSCell," R4-1800940, 3GPP TSG RAN WG4 #AH-1801, San Diego, California, US, Jan. 22-26, 2018, 6 pages.

Ericsson, "Multiple measurement object scaling requirements," R4-1812095, 3GPP TSG RAN WG4 #88b, Chengdu, China, Oct. 8-12, 2018, 4 pages.

LG Electronics, "Discussion on measurement of SFTD for EN-DC," R4-1802423, 3GPP TSG RAN WG4 #86, Athens, Greece, Feb. 26-Mar. 2, 2018, 5 pages.

NTT Docomo, Inc., "Measurement Gap Timing Advance for LTE serving cells," R2-1805129, 3GPP TSG RAN WG2 #101b, Sanya, China, Apr. 16-20, 2018, 4 pages.

ZTE Corporation, et al., "SMTC configuration in asynchronous networks," R2-1802022, 3GPP TSG RAN WG2 #101, Athens, Greece, Feb. 26-Mar. 2, 2018, 6 pages.

Examination report dated Mar. 15, 2024, in connection with Indian Application No. 202217021123, 7 pages.

Office Action dated Jan. 24, 2025, in connection with Korean Application No. 10-2019-0126207, 11 pages.

* cited by examiner

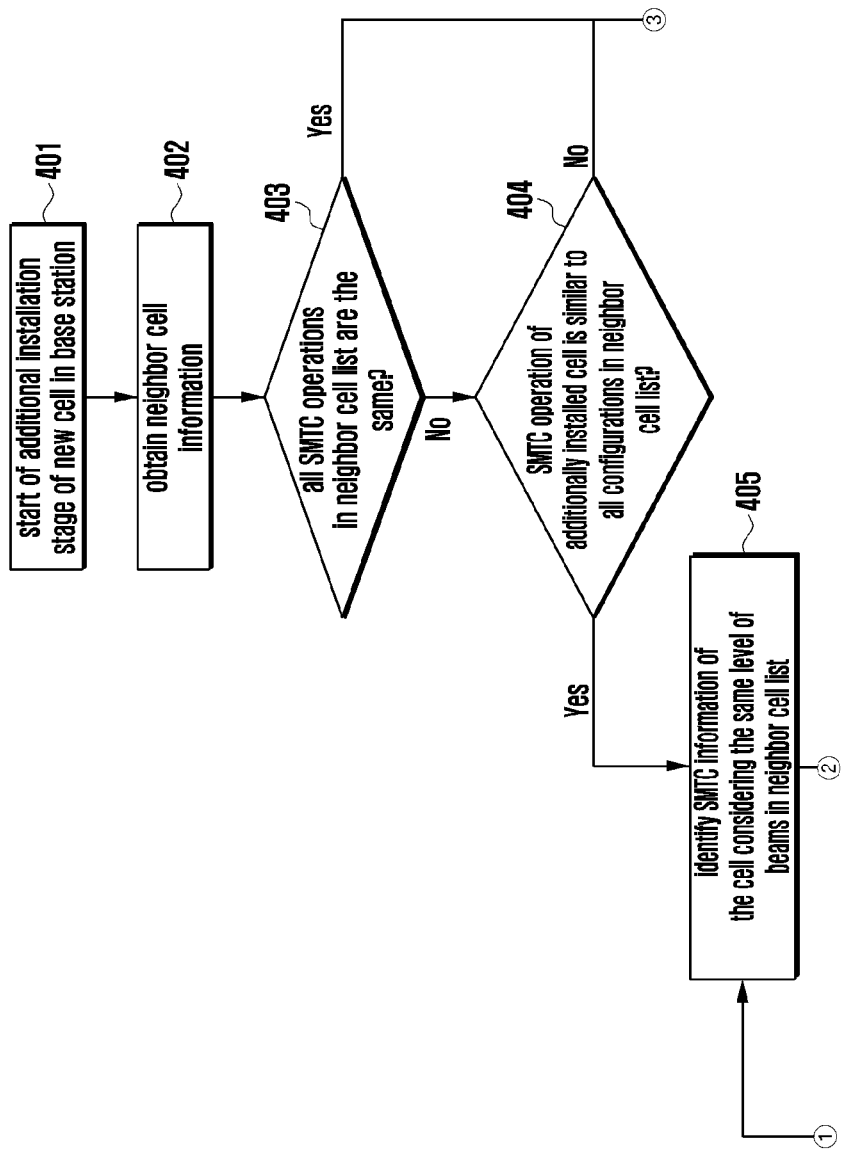

METHOD AND DEVICE FOR MEASURING FREQUENCY IN 5G COMMUNICATION SYSTEM

CROSS-REFERENCE TO RELATED APPLICATIONS

This application is a 371 National Stage of International Application No. PCT/KR2020/013869, filed Oct. 12, 2020, which claims priority to Korean Patent Application No. 10-2019-0126207, filed Oct. 11, 2019, the disclosures of which are herein incorporated by reference in their entirety.

BACKGROUND

1. Field

The disclosure is related to a frequency measurement method in a 5G communication system including both Non-Standalone (NSA) and Standalone (SA). More particularly, the frequency measurement method utilizing the SS/PBCH block (SSB) introduced for 5G based on 3GPP (3rd generation partnership project) Release-15 can be used to measure the radio environment of the serving and neighbor cells, and relates to a technique for serving cell change and handover in consideration of the mobility of a terminal.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMlP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

When an NR cell is additionally installed at first in an existing base station, an optimal beam method should be selected first at the time of additional installation from the network design point of view according to the topography (city center, mountain, highway, railroad, etc.) in which the cell will be operated or the height to be covered (high-rise building, plain, stadium, etc.). In this case, there is a need for an NR network method that can minimize radio resources subject to transmission and reception restrictions by finding the most appropriate SSB measurement timing configuration (SMTC) and configuring a measurement gap while allowing the terminal to move between cells with reduced call interruption by increasing handover performance with low system overhead at the same time.

Further, since the NR or LTE base station based on the determined SMTC method in the NR cell depends on the frequency characteristics, the UE capability, SMTC operation, system operation, or the other required for the terminal to measure the 5G frequency, there is a need for an algorithm that manages candidates in advance or determines suitable configuration values.

Finally, in the 5G system based on the LTE-NR dual connectivity technology, the introduction of NSA in particular can be extended to NR-NR dual connectivity, and hence a situation in which TDD frame timing should be applied differently to avoid base station-base station or terminal-terminal interference between adjacent bands is considered.

The technical objectives to be achieved in embodiments of the disclosure are not limited to those mentioned above, and other technical objectives not mentioned will be clearly understood by those of ordinary skill in the art to which the disclosure belongs from the following description.

In the disclosure for solving the above problems, an method of a base station may include: receiving information about a neighbor cell; determining parameters for setting a measurement timing different from a measurement timing of the neighbor cell based on the neighbor cell information;

determining a measurement gap (MG) based on the parameters and SS/PBCH block measurement timing configuration (SMTC) related information; and transmitting the measurement gap to a terminal.

In some examples, the method may further include obtaining the SMTC-related information based on the parameters and information for frequency measurement, and the information for frequency measurement may be managed in a table.

In some examples, the method may further include receiving information about a difference in frame timing from the terminal, and the information for frequency measurement may include the information about the difference in frame timing.

In some examples, the method may further include correcting timing-related information between different base stations by using the information about the difference in frame timing. In some examples, the parameters may include at least one of SSB subcarrier spacing (SCS), SSB number, SSB frequency, or SSB location, and the SMTC-related information may include at least one of maximum SMTC length or slot length actually occupied by an SSB.

In some examples, determining a measurement gap may include: determining a measurement gap timing advance (MGTA); and determining a gap sharing ratio value.

In some examples, in case that there is a change in the SMTC-related information, the method may include: determining a measurement gap based on the determined parameters and the changed SMTC-related information; and transmitting the determined measurement gap to the terminal.

In some examples, the method may further include identifying a measurement gap capability of the terminal, and the measurement gap may be determined based on the measurement gap capability.

In another example of the disclosure, an method of a terminal may include: measuring information about a difference in frame timing between plural base stations; transmitting the information about the difference in frame timing to a base station; and receiving a measurement gap (MG) from the base station, and wherein the measurement gap may be determined based on parameters, which set a measurement timing different from that of a neighbor cell based on information received from the neighbor cell, and SS/PBCH block measurement timing configuration (SMTC) related information.

In some examples, the SMTC-related information may be obtained based on the parameters and information for frequency measurement, the information for frequency measurement may be managed in a table, and the information for frequency measurement may include the information about the difference in frame timing.

In other examples of the disclosure, a base station may include: a transceiver capable of transmitting and receiving at least one signal; and a controller coupled to the transceiver, wherein the controller may be configured to: receive information about a neighbor cell; determine parameters for setting a measurement timing different from a measurement timing of the neighbor cell based on the neighbor cell information; determine a measurement gap (MG) based on the parameters and SS/PBCH block measurement timing configuration (SMTC) related information; and transmit the measurement gap to a terminal.

In other examples of the disclosure, a terminal may include: a transceiver capable of transmitting and receiving at least one signal; and a controller coupled to the transceiver, wherein the controller may be configured to: measure information about a difference in frame timing between plural base stations; transmit the information about the difference in frame timing to a base station; and receive a measurement gap (MG) from the base station, and wherein the measurement gap may be determined based on parameters, which set a measurement timing different from that of a neighbor cell based on information received from the neighbor cell, and SS/PBCH block measurement timing configuration (SMTC) related information.

In a 5G communication system operating based on SSB beam operation with various locations and settings, the disclosure 1) monitors the wireless environment in service by measuring the frequency of the serving cell and, 2) performs optimization to reduce performance loss when moving to a better wireless environment and enables seamless transmission and reception by measuring the frequency of a neighbor cell.

In addition, when there is a SFTD (SFN and frame timing difference) in a multi-connectivity structure that utilizes all of LTE, FR1 (below-6 GHz NR), and FR2 (above-6 GHz NR) in NSA and SA, a method for accurately analyzing the SMTC (SSB measurement timing configuration) in the serving cell and neighbor cell is proposed to enable continuous service without call interruption during movement. The above SFTD analysis should consider a similar method when not only measuring frequency but also sharing timing related information between base stations.

In addition, to efficiently utilize the measurement gap defined by the NSA and SA standards, SMTC cross arrangement is proposed in case of additional cell installation; and a method for creating and managing an RRM (radio resource management) management table is proposed for accurate configuration in the terminal accessed from multiple cells. In the measurement gap period, service disconnection and instability may occur, so optimization is required according to the disclosure, and it is important to prevent a situation in which paging and system information cannot be received particularly in the 5G multi-connectivity structure.

BRIEF DESCRIPTION OF THE DRAWINGS

FIGS. 4A and 4B are a flowchart illustrating operations of a base station for applying or not applying SMTC cross-arrangement configuration when a new cell is additionally installed.

DETAILED DESCRIPTION

Figure 1:
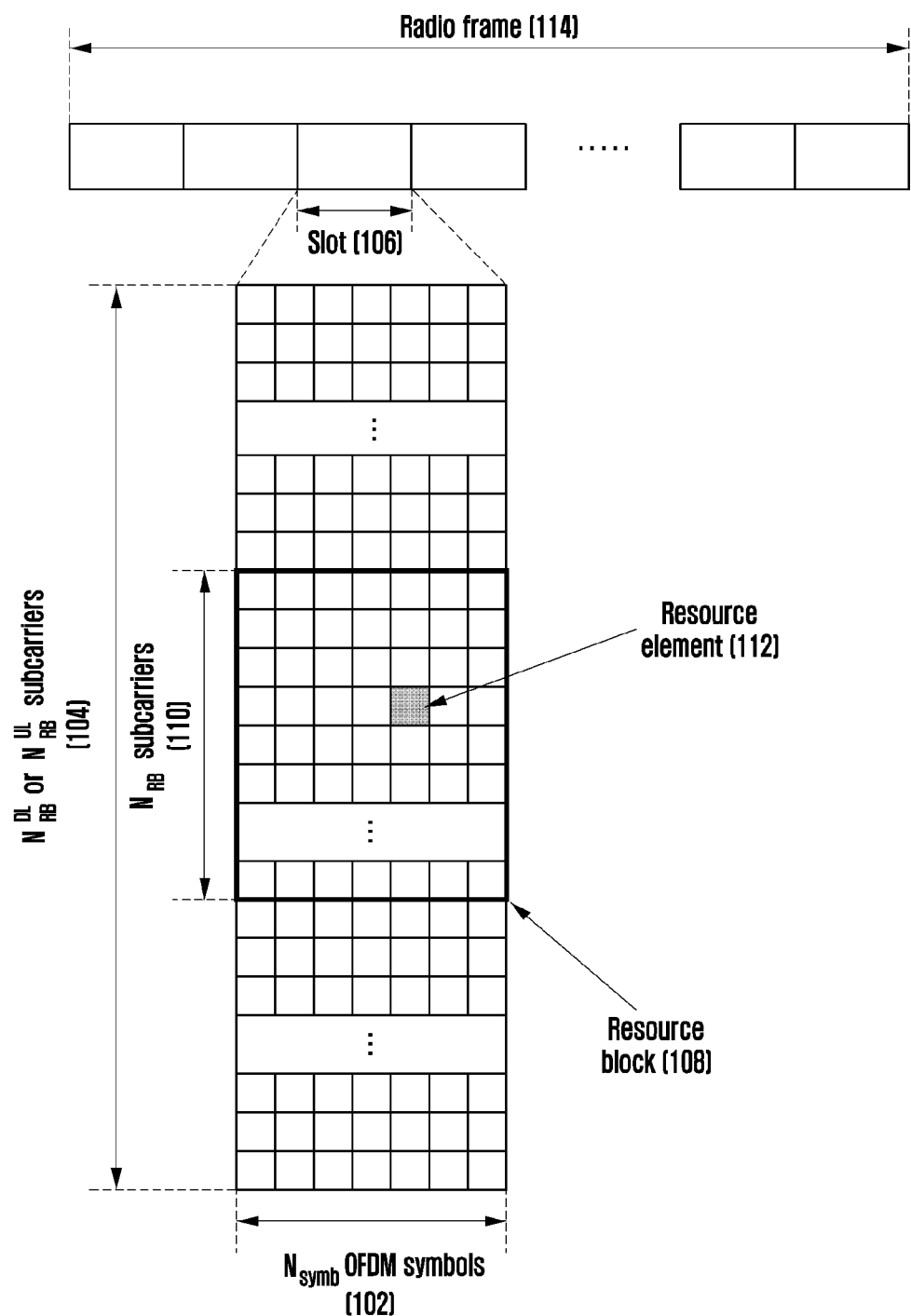
FIG. 1 is a diagram illustrating a basic structure of a time-frequency domain, which is a radio resource region in which a data or control channel is transmitted in the downlink or uplink of an NR system.

Hereinafter, exemplary embodiments of the disclosure will be described in detail with reference to the accompanying drawings. It should be noted that in the accompanying drawings, the same components are denoted by the same reference symbols whenever possible. In addition, detailed descriptions of well-known functions and structures that may obscure the gist of the present disclosure will be omitted.

In the description of embodiments of the present specification, descriptions of technical details well known in the art and not directly related to the disclosure may be omitted. This is to more clearly convey the gist of the disclosure without obscurities by omitting unnecessary descriptions.

Likewise, in the drawings, some elements are exaggerated, omitted, or only outlined in brief. Also, the size of each element does not necessarily reflect the actual size. The same reference symbols are used throughout the drawings to refer to the same or corresponding parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the specification to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Additionally, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Further, components and units may be implemented to drive one or more processors in a device or a secure multimedia card.

FIG. 1 is a diagram illustrating a basic structure of a time-frequency domain, which is a radio resource region in which a data or control channel is transmitted in the downlink or uplink of an NR system.

In FIG. 1, the horizontal axis denotes the time domain and the vertical axis denotes the frequency domain. In the time domain, the minimum transmission unit is OFDM symbols, and Nsymb OFDM symbols 102 are grouped to form one slot 106. The length of a subframe is defined to be 1.0 ms, and the radio frame 114 is defined to be 10 ms. In the frequency domain, the minimum transmission unit is subcarriers, and the total system transmission bandwidth is composed of a total of NBW subcarriers 104.

A basic unit in the time-frequency domain is a resource element (RE) 112, which may be represented by an OFDM symbol index and a subcarrier index. A resource block (RB, or physical resource block (PRB)) 108 may be defined by Nsymb consecutive OFDM symbols 102 in the time domain and NRB consecutive subcarriers 110 in the frequency domain. Hence, one RB 108 is composed of Nsymb x NRB REs 112. In general, the minimum transmission unit of data is the RB unit. Generally in the NR system, Nsymb =14 and NRB =12, and NBW is proportional to the bandwidth of the system transmission band. The data rate may be increased in proportion to the number of RBs scheduled for the UE.

In the case of an FDD system where the downlink and the uplink are separated by a frequency in the NR system, the downlink transmission bandwidth and the uplink transmission bandwidth may be different from each other. The channel bandwidth represents an RF bandwidth corresponding to the system transmission bandwidth. Table 1 and Table 2 show a part of the correspondence between the system transmission bandwidth, subcarrier spacing, and channel bandwidth defined for the NR system in a frequency range lower than 6 GHz and a frequency range higher than 6 GHz, respectively. For example, in an NR system having a subcarrier spacing of 30 kHz and a channel bandwidth of 100 MHz, the transmission bandwidth is composed of 273 RBs. In the following, N/A may indicate a bandwidth-subcarrier combination not supported by the NR system.

TABLE 1

Composition of FR1 (frequency range 1)

| | Subcarrier spacing | Channel bandwidth BW$_{Channel}$ [MHz] | | | | | |
|---|---|---|---|---|---|---|---|
| | | 5 MHz | 10 MHz | 20 MHz | 50 MHz | 80 MHz | 100 MHz |
| Transmission bandwidth configuration N$_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

Composition of FR2 (frequency range 2)

| | Subcarrier spacing | Channel bandwidth BW$_{Channel}$ [MHz] | | | |
|---|---|---|---|---|---|
| | | 50 MHz | 100 MHz | 200 MHz | 400 MHz |
| Transmission bandwidth configuration N$_{RB}$ | 60 kHz | 66 | 132 | 264 | N/A |
| | 120 kHz | 32 | 66 | 132 | 264 |

In the NR system, the frequency range can be divided into FR1 and FR2 and defined as follows.

TABLE 3

| Frequency range designation | Corresponding frequency range |
|---|---|
| FR1 | 450 MHz-7125 MHz |
| FR2 | 24250 MHz-52600 MHz |

The range of the above FR1 and FR2 may be changed and applied differently. For example, the frequency range of FR1 may be changed and applied in a range from 450 MHz to 6000 MHz.

First, a description is given of actions to be considered when an NR cell is additionally installed in an existing base station that efficiently utilizes the measurement gap defined by the NSA and SA standard. For example, depending on the topography (city center, mountain, highway, railroad, etc.) in which the corresponding cell is to be operated or the height to be covered (high-rise building, plain, stadium, etc.), an optimal beam method may be selected first at the time of installation from a network design point of view. In this way, before the SMTC is determined to search for different SSBs for individual cells, it is aimed at an NR network method that has a small system overhead and minimizes radio resources subject to transmission and reception restrictions by searching for the most suitable SMTC and allocating a measurement gap while reducing call disconnection by increasing handover performance when the UE moves between cells.

Only a part of the SSB in the system information used by the base station may be configured as SMTC in the UE. Although this SMTC operation scenario has a trade-off with neighbor cell RRM performance of the UE, it can be used to increase HO latency performance due to the characteristics of the 5G system, which requires measuring many SSB beams for determination. For example, when a 5G cell broadcasts 2N SSBs, only half of them, N SSB periods, can be configured and operated as SMTC. Which N combinations are to be used as the reference for SMTC configuration can reflect the beam-book design method used in SSB-based beam operation, and consider configuring different SMTCs by classifying the frequency band of the serving and neighbor cells, sub-carrier spacing (SCS), cell ID, or the like.

Figure 2:
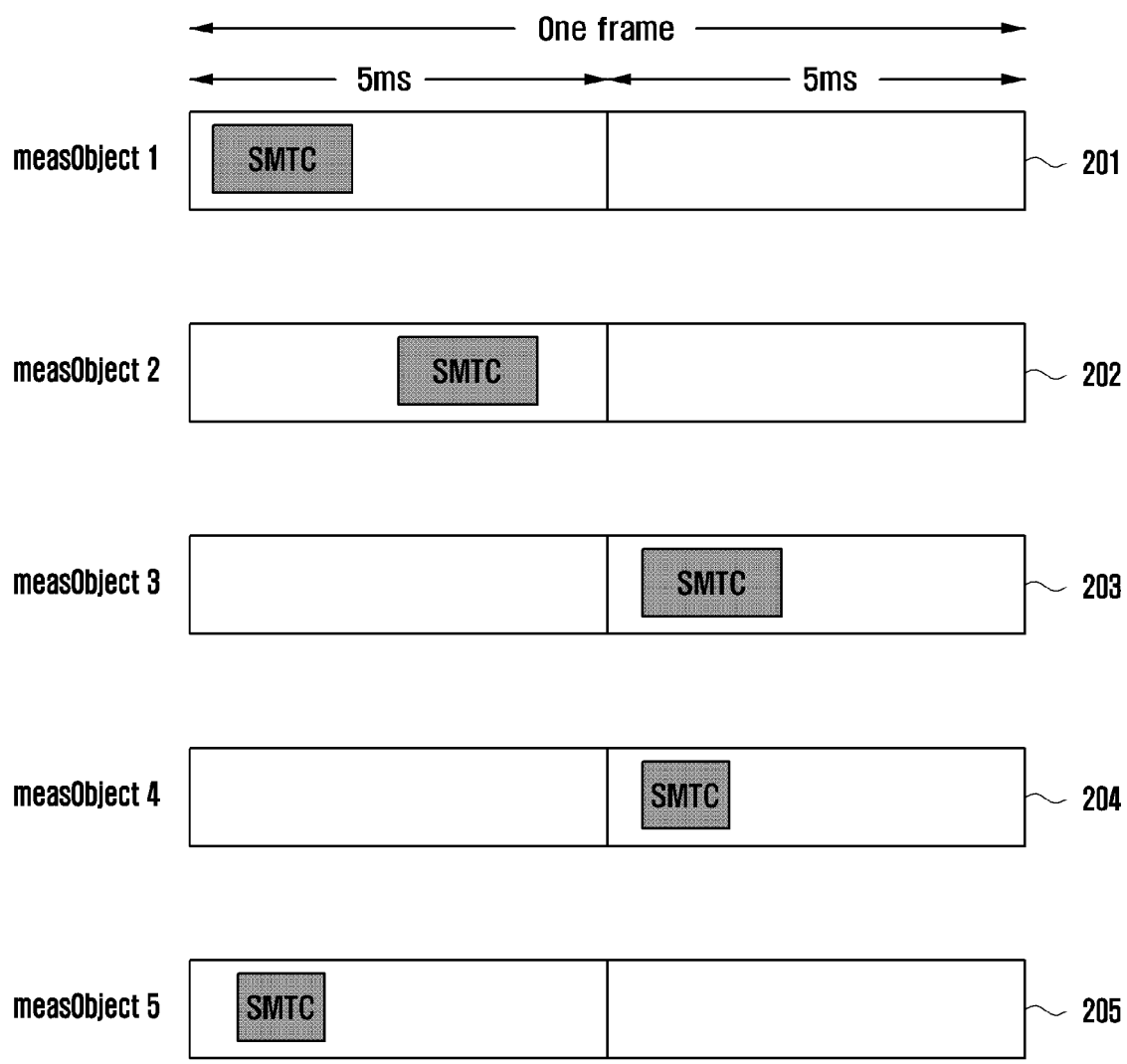
FIG. 2 is a diagram illustrating an example of an SMTC cross-arrangement scheme for each measObject configuration to operate different SMTCs in different cells.

FIG. 2 is a diagram illustrating an example of an SMTC cross-arrangement scheme for each measObject configuration to operate different SMTCs in different cells.

FIG. 2 shows positions of SMTCs that can be differently arranged for configurable frequency measurement units (measObject) in the same frame (201 to 205). The SMTCs may be positioned differently depending on the SSB to be used in the corresponding band, SCS, or the number of SSBs according to the beam operation technique. Further, in some cases, the SMTC may be positioned in the 1st-half frame (201, 202, 205) or in the 2nd-half frame (203, 204). In LTE-NR coexistence operation or dual-connectivity operation, since it is necessary to consider that there is no serious deterioration in reception performance of paging, system information, and control/reference signaling for both systems, the positions of SMTCs for frequency measurement can be considered from the additional installation stage of the 5G cell. In addition, the following items can be considered in advance for SMTC arrangement at the time of additional cell installation.

The SMTC does not necessarily include all SSB bursts. That is, in SSB-beam operation, the SMTC can be adjusted according to the beam scan-range or beam-book design.

The measurement gap is basically configured to cover all SMTCs. If this is not easy, it is necessary to check whether it is acceptable to miss some SSBs according to the beam scan-range or beam-book design.

The measurement gap length is related to the scheduling restriction section, and SSB bursts are not arranged far apart if possible.

For the measurement gap to cover the SMTC, the UE RF switching time defined in the standard must be reflected. This can be set directly by the base station as a measurement gap timing advance (MGTA), and some SMTCs may be not measured when it is not reflected due to the absence of the UE capability.

Minimize the number of DL slots occupied by multi-SSBs required by each operator unless mini-slot scheduling is universally supported. That is, DL slots that can be used by PDSCH scheduling are assigned to the maximum.

Depending on the length of gap symbols in a TDD flexible slot, there may be restrictions on the position of SSBs that can be arranged. The gap symbol length is determined to avoid interference between the uplink timing advance and the downlink, and is determined by initial access (RACH) coverage operation.

Depending on a specific operation plan, the SSB center frequency (RB position) can be arranged differently. In this case, the UE performs inter-frequency measurement even in the same NR band and requires a measurement gap.

As another example of a different configuration of the SMTC, the SSB frequency and SSB position in system information set by the base station may be configured differently. For example, when additionally installing a cell, if the cell number of the additionally installed cell is odd, configuration A may be used, and if the cell number is even, configuration B may be used. These different SSB frequency and SMTC configurations can increase the RRM performance of the UE because both the SMTC of the serving cell and the SMTC of the neighbor cell can be read when HO is performed due to the movement of the UE within the 5G network. Further, to lower the system information overhead of the base station, the SSB positions may be set alternately, and the scheduling constraints may be not applied when the neighbor cell frequency is not measured. When these operations are performed, the measurement gap may be configured by the central unit (CU) for measuring different SSB frequencies. The measurement gap to be configured is considered as a pattern that covers SMTCs set differently for individual cells and has as few scheduling constraints as possible. This method can increase the frequency measurement RRM performance by up to +100% without significantly increasing the system overhead.

Figure 3:
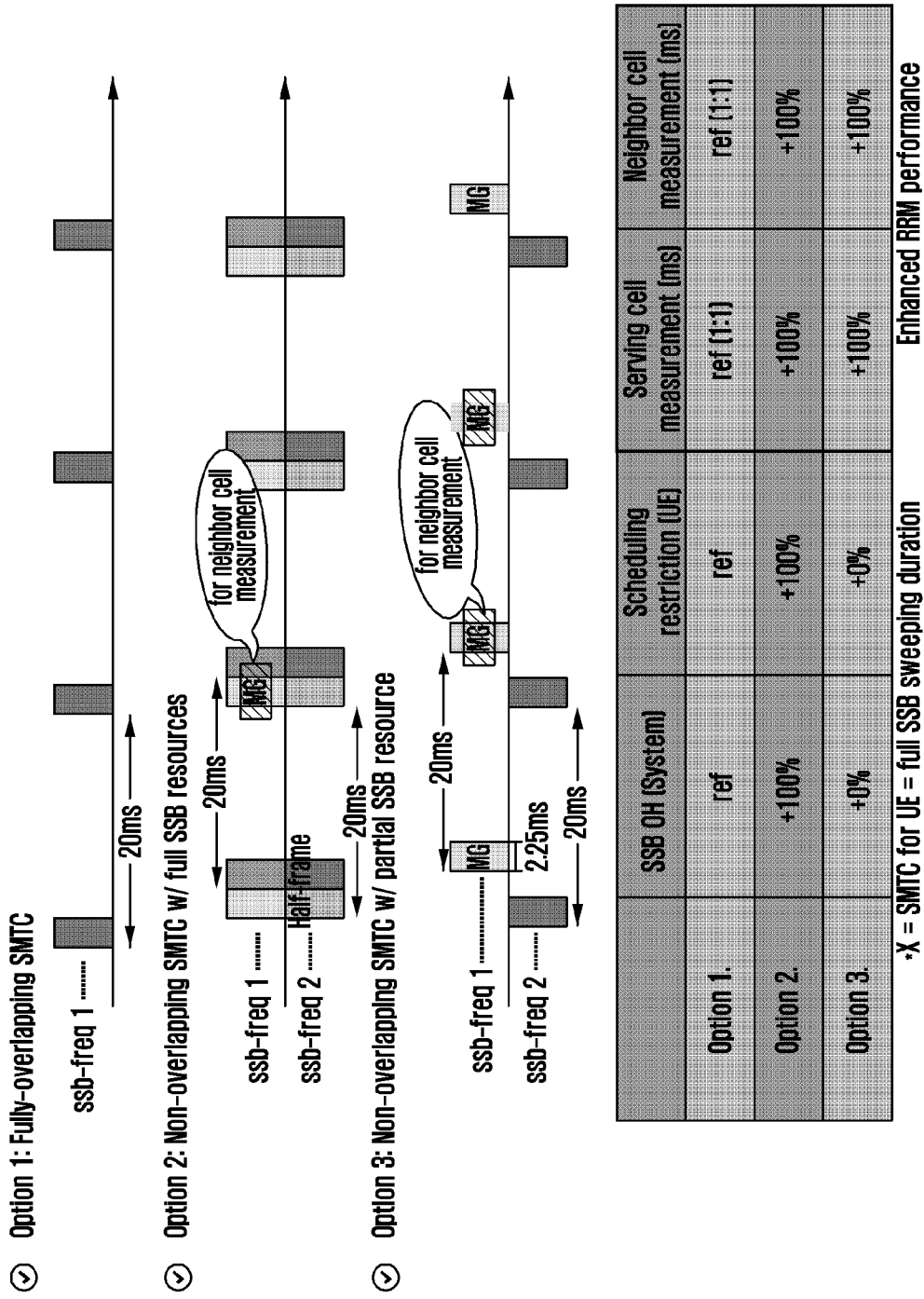
FIG. 3 is an illustrative diagram for comparing gains obtainable by SMTC cross- arrangement configurations.

FIG. 3 is an illustrative diagram for comparing gains obtainable by SMTC cross- arrangement configurations.

As shown in FIG. 3, Option 1 is an example in which SMTC configurations are fully overlapping and is the reference for comparison with Option 2 and Option 3 below. Compared to Option 1, Option 2 is an example in which SSB positions are set identically and SSB frequencies are arranged differently at the time of additional cell installation. This improves the RRM performance of serving cell measurement and neighbor cell measurement because both the serving cell's SMTC and the neighbor cell's SMTC can be read. However, the system information overhead of the base station increases, and scheduling constraints may be applied when the neighbor cell frequency measurement is not performed. As an example of a situation where scheduling constraints are applied, a situation may be considered in which all cells operate N beams and the configuration is set to measure the serving cell at a preceding TDM location and measure the neighbor cell at a succeeding TDM location. In this case, the succeeding TDM location for the neighbor cell frequency measurement may be added to the scheduling constraints. This may be applied when the UE cannot connect to the serving cell and the neighbor cell by using the same reception beam in a wireless communication system that operates beams. Compared to Option 2, in Option 3, the configuration of different SSB frequencies and SMTCs at the time of additional cell installation can increase the RRM performance of the UE because both the SMTC of the serving cell and the SMTC of the neighbor cell can be read when HO is performed due to the movement of the UE within the 5G network, and it allows the SSB positions to be set alternately to lower the system information overhead of the base station, and prevents the scheduling constraints from being applied when the neighbor cell frequency is not measured. When these operations are performed, the measurement gap may be configured by the CU for measuring different SSB frequencies. The measurement gap to be configured is considered as a pattern that covers SMTCs set differently for individual cells and has as few scheduling constraints as possible. That is, Option 3 can increase the frequency measurement RRM performance by up to +100% without significantly increasing the system overhead.

Figure 4B:
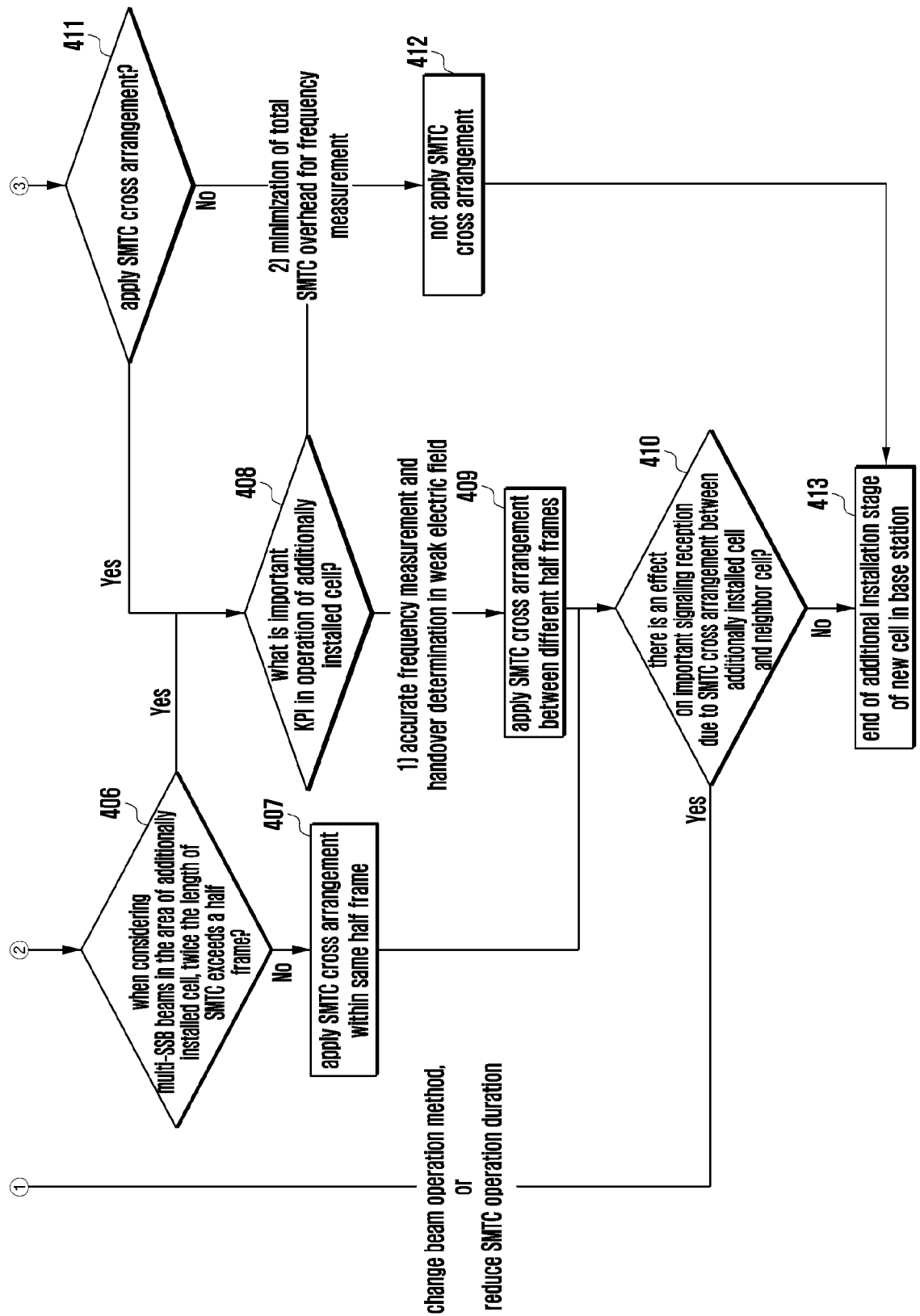

FIGS. 4A and 4B are a flowchart illustrating operations of the base station for applying or not applying SMTC cross-arrangement configuration when a new cell is additionally installed.

The operation flow shown in FIGS. 4A and 4B shows operations to be considered for SMTC configuration and arrangement when a new cell is added to the base station. Additional installation of a new cell may be started in the base station (operation 401). The base station may obtain neighbor cell information to apply SMTC cross arrangement (operation 402).

If there is no information on the neighbor cell when the SMTC configuration to be operated in the cell to be additionally installed is determined, the SMTC configuration must be set in consideration of only beam operation and frequency measurement in a single cell, in which case it may be difficult to apply SMTC operation optimization.

The base station may determine whether all SMTC operations in the neighbor cell list are the same (operation 403). For example, the base station may specifically determine whether all SMTC operations used in the neighbor cell list are the same or determine the degree to which the SMTC operations are different. If all SMTC operations used in the neighbor cell list are the same at operation 403, as the gain obtained by the SMTC cross arrangement may be not large, the base station may determine not to apply the SMTC cross arrangement at operation 411. Additionally, if SMTC operations used in the neighbor cell list are not the same or are different at a preset level or higher at operation 403, the base station may determine whether the SMTC operation of the cell to be additionally installed is similar to all configurations in the neighbor cell list at operation 404.

When neighbor cell information is obtained, if all SMTCs used in the neighbor cell list are unified, or if the SMTC configuration and beam operation to be operated in the cell to be additionally installed are too different from those of neighbor cells, the gain obtainable by SMTC cross arrangement may be not large. For example, if the configurations of neighbor cells are all the same, it may be rather unstable network design to have a different configuration for only the corresponding cell. If it is determined to be such an embodiment, the SMTC cross arrangement is not applied and the same arrangement is used. For example, if SMTC operations used in the neighbor cell list are the same at operation 403, it may be determined that SMTC cross arrangement is not applied at operation 411 and SMTC cross arrangement may be not applied at operation 412.

As an opposite example, although the configurations of neighbor cells are all the same, if there is a benefit in RRM performance and network design to have a different configuration for only the corresponding cell, cross arrangement is applied. As an example of determining the benefit in RRM performance and network design, in the case of an attempt to provide a service by additionally installing a cell for supporting only UEs of a specific type, the application of cross arrangement may enable providing separate configurations for different service types of the UEs. For example, if a special-purpose cell for a railroad, a highway or the like is separately operated, performance improvement can be achieved by preventing unnecessary handover of the UE or scheduling interruption due to neighbor cell RRM. Besides the service type, the corresponding embodiment can be applied to a case where the network designer desires cross arrangement, that is, grouping for a special purpose. For example, if SMTC operations used in the neighbor cell list are the same at operation 403, whether to apply SMTC cross arrangement may be determined at operation 411, and SMTC cross arrangement may be not applied at operation 412.

If SMTC operations used in the neighbor cell list are not the same or are different more than a preset level at operation 403, the procedure may proceed to operation 404. At operation 404, the base station may determine whether SMTC operations of the cell to be additionally installed are similar to all configurations in the neighbor cell list. Whether SMTC operations are similar to all configurations in the neighbor cell list may be determined according to whether they are different from all configurations in the neighbor cell list more than a preset level. If it is determined that they are similar, the procedure may proceed to operation 405; if it is determined that they are not similar, the procedure may proceed to operation 411.

Upon determining that the SMTC configuration and beam operation to be used in the cell to be additionally installed are similar to those of neighbor cells, at operation 405, the base station identifies SMTC information of the cell considering the same level of beams in the neighbor cell list. Identifying the SMTC information may include checking the SMTC length. For example, the base station determines that cross arrangement is possible by applying a similar operation and checks how long the SMTC is.

At operation 406, the base station determines whether twice the length of the SMTC exceeds a half frame. For example, when considering multi-SSB beams in the area of the cell to be additionally installed, the base station may determine whether twice the length of the SMTC exceeds a half frame. If not exceeding at operation 406, the procedure may proceed to operation 407; if exceeding, the procedure may proceed to operation 408. If twice the length of the SMTC exceeds a half frame, as SMTC cross arrangement can lead to an increase in SMTC overhead in the entire frame, whether to apply the cross arrangement may be determined after checking what the key performance indicator (KPI) is in the cell to be additionally installed (operation 408). If it is necessary to enable accurate frequency measurement and handover determination in a weak electric field through cross arrangement, cross arrangement between different half frames may be applied at operation 409. If it is desired to prevent an increase in overhead, it is possible to operate the SMTC in unison with neighbor cells without applying SMTC cross arrangement at operation 412.

As another embodiment, if twice the length of the SMTC does not exceed a half frame, it may be determined that the overhead increase rate due to the SMTC cross arrangement is small, and the cross arrangement within a single half frame may be applied (operation 407).

At operation 410, the base station determines whether there is an effect on important signaling reception due to the SMTC cross arrangement between the cell to be additionally installed and the neighbor cell. That is, the base station can check whether the reception of important signaling is deteriorated when the SMTC cross arrangement scheme described above is applied. For example, when a measurement gap covering the SMTC is configured in the UE, if it greatly affects the paging signal, system information, or reference/control signaling, the base station re-performs the operation of comparison with the neighbor cells at operation 405 while considering changing the beam method or replacing the SMTC method.

When confirming the configuration for SMTC cross arrangement in the above way, the base station may end the operation of new cell installation (operation 413).

Although the above-described cross arrangement method may arrange two or more patterns in a mixed form, the overhead required for the UE to measure multiple 5G frequencies increases as the SMTC configurations of different neighbor cells are diversified, it is possible to configure the same SMTC option in similar frequency bands and similar operating situations and consider the configuration between gNB-CU and UE of the disclosure as a solution.

The NR base station or LTE base station based on the SMTC method in the NR cell determined as described above may perform a configuration operation for the UE to measure a 5G frequency. Specific operations are described below. As the parameters required for configuring 5G frequency measurements depend on frequency characteristics, UE capability, SMTC operation, or system operation, the disclosure is to propose an algorithm that manages candidates or determines appropriate setting values in advance. In the disclosure, a description is given below of a method for generating parameters to be managed for frequency measurement, a method for managing the generated parameters, and the like.

When the base station configures a measurement gap to the UE for NR frequency measurement, the base station must manage the type of frequencies to be measured and configurable measurement gaps in advance. In addition, SMTC information of each serving or neighbor cell can be managed in advance by classifying base stations, frequencies, and cells to be measured. The table to be created and managed by the base station to determine various parameter values for 5G frequency measurements can be illustrated as follows.

TABLE 4

Illustration of management table for each operator for 5G frequency measurement

| Operator | Freq. Range, SSB SCS | Max. SSB Length | SMTC Length | Feasible GP, Offsets | Gap sharing | Total interrupted time if MGTA needed, |
|---|---|---|---|---|---|---|
| Operator A | B6G(<3 GHz) (15k SCS) | 2 ms (4 SSBs in 2 slots) | 2 sf | GP 2, 3, 10, 11 | X | +1 ms |
| | B6G(<3 GHz) (30k SCS) | 1 ms (4 SSBs in 2 slots) | 1 sf | GP 2, 3, 10, 11 | X | +1 ms |
| Operator B | B6G(>3 GHz) (15k SCS) | 4 ms (8 SSBs in 4 slots) | 4 sf | GP 6-9 | ○ | +1 ms |
| | B6G(>3 GHz) (30k SCS) | 2 ms (8 SSBs in 4 slots) | 2 sf | GP 2, 3, 10, 11 | ○ | +1 ms |
| | A6G (120k SCS) | 4.875 ms (64 SSBs in 39 slots) | 5 sf | GP 0-5, (GP 12-15) | ○ | +0.5 ms (if per-FR gap supported) |
| | A6G (240k SCS) | 2.4375 ms (64 SSBs in 39 slots) | 3 sf | GP 2, 3, 6-9 (GP 16-19) | ○ | +0.5 ms (if per-FR gap supported) |

Figure 5:
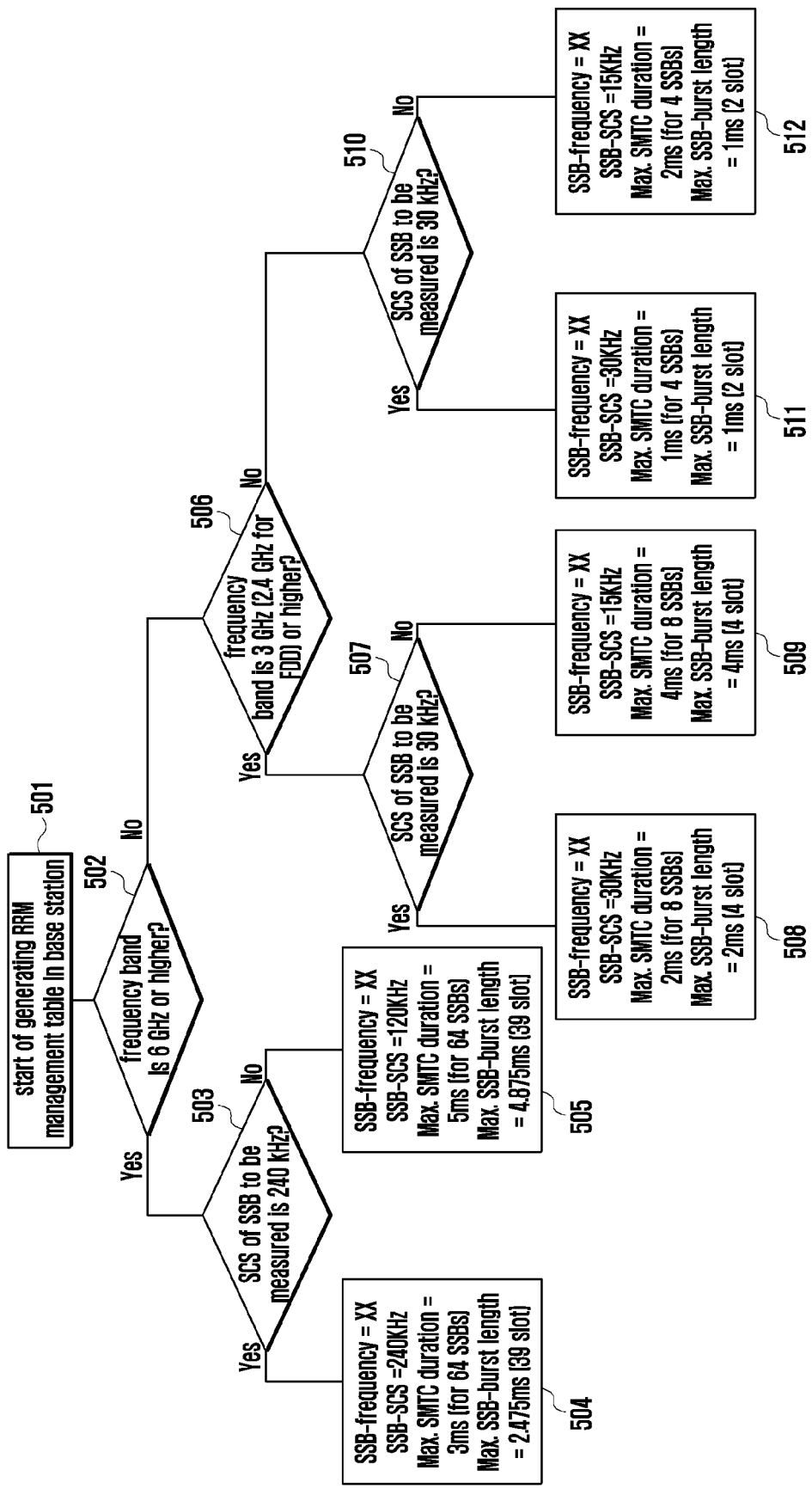
FIG. 5 is a diagram illustrating an operation of identifying SSB information and classifying parameters in the table as an initial stage of generating an RRM management table for 5G frequency measurement.

FIG. 5 is a diagram illustrating an operation of identifying SSB information and classifying parameters in the table as an initial stage of generating an RRM management table for 5G frequency measurement.

With reference to FIG. 5, the base station may generate an RRM management table in the base station (operation 501). At operation 502, the base station may determine whether the frequency band in the base station is 6 GHz or higher. If the frequency band in the base station is 6 GHz or higher at operation 502, the base station may determine whether the SCS of the SSB to be measured is 240 kHz (operation 503). If the frequency band in the base station is 6 GHz or less, the base station may determine whether the frequency band is 3 GHz (2.4 GHz for FDD) or higher (operation 506). If the frequency band is 3 GHz (2.4 GHz for FDD) or higher, the base station may determine whether the SCS of the SSB to be measured is 30 kHz (operation 507). Also, if the frequency band is 3 GHz (2.4 GHz for FDD) or less, the base station may determine whether the SCS of the SSB to be measured is 30 kHz (operation 510). According to the determination at operation 503, operation 507, and operation 510, SSB-frequency, SSB-SCS, max SMTC duration, max SSB-burst length, etc. may be determined (operation 504, operation 505, operation 508, operation 509, operation 511, operation 512). That is, in FIG. 5, the maximum SMTC length, the slot length actually occupied by the SSB, or the like can be identified according to the frequency band range, the SSB SCS to be measured, the SSB frequency value to be measured, and the like.

Figure 6:
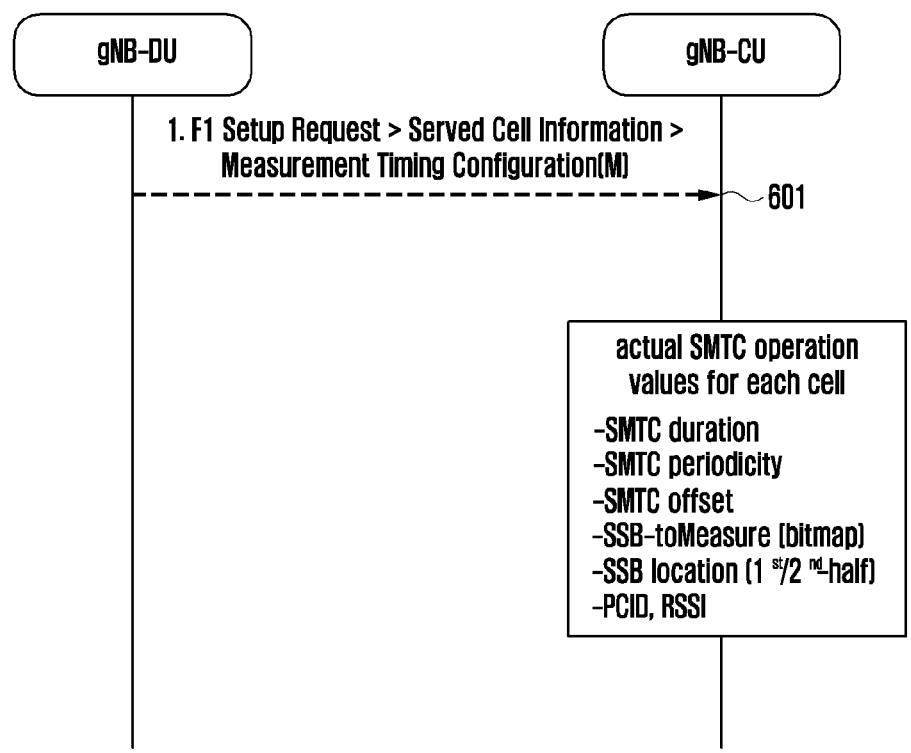
FIG. 6 is a diagram illustrating an operation in which the gNB-DU transmits SMTC operation parameters set at the cell installation stage to the gNB-CU.

FIG. 6 is a diagram illustrating an operation in which the gNB-DU (distributed unit) transmits SMTC operation parameters set at the cell installation stage to the gNB-CU (central unit).

First, the gNB-DU may include a set of low gNB functions according to the functional split option and its operation may be controlled by the CU. Further, the gNB-CU may include gNB functions such as user data transmission, mobility control, radio access network sharing, positioning, and session management except for the functions assigned exclusively to the DU.

With reference to FIG. 6, because the operating values may be different for individual cells due to SMTC cross arrangement or the other, the base station may manage the actual SMTC operation parameters separately from the max SMTC operation values determined in FIG. 5 according to the frequency band, the SCS, or the other, and may use them for accurate measurement gap setting or SFTD correction operations. The base station may manage different SMTC operation values for individual cells as parameters to be configured to the UE, and use them when information needs to be shared between gNBs or between the MCG and the SCG of eNB/gNB in DC. Actual SMTC operation values of the cell may be basic information for frequency measurement settings, and may affect the increase or decrease in overhead for frequency measurement between the UE and the base station according to the accurate SMTC configuration. For example, the gNB-DU may transmit information about the cell to the gNB-CU (operation 601). The information about the cell may include SMTC operation parameters configured at the installation stage. Specifically, the information about the cell may be information about the measurement timing configuration. Upon receiving the information, the gNB-CU may manage it together with the actual SMTC operation values for each cell. The actual SMTC operation values for each cell may include SMTC duration, SMTC periodicity, SMTC offset, SSB-toMeasure, SSB location, PCID, RSSI, or the like.

Figure 7:
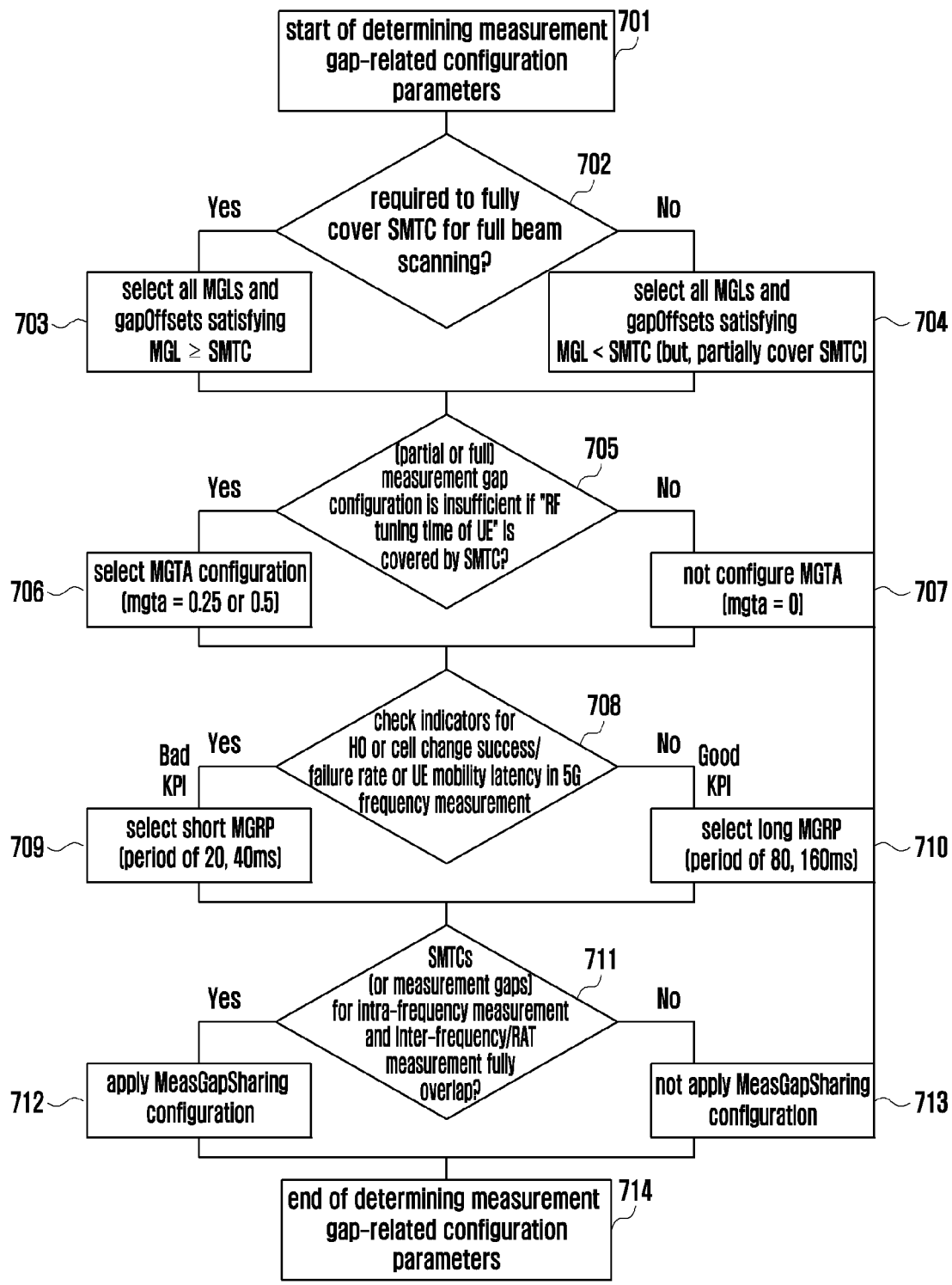
FIG. 7 is a diagram illustrating an operation of the base station for determining measurement gap related parameters in the RRM management table for 5G frequency measurement.

FIG. 7 is a diagram illustrating an operation of the base station for determining measurement gap related parameters in the RRM management table for 5G frequency measurement.

The gNB base station may start to determine the measurement gap-related configuration parameters while knowing the information about the SMTC to be actually used from operations of FIG. 6 (operation 701). First, when a measurement gap is required based on the SMTC and beam operation information, the base station may determine whether it is necessary to fully cover the SMTC (operation 702). If it is sufficient to fully or partially cover the SMTC to be configured, the base station may perform configuration to partially cover the SMTC. If full beam scanning is possible only when the SMTC is fully covered, the base station selects all MGLs and gapOffsets that satisfy the condition in which the measurement gap length (MGL) is greater than the SMTC (operation 703). On the other hand, if full beam scanning is possible even when the SMTC is partially covered, the base station selects all MGLs and gapOffsets that satisfy the condition in which the MGL is less than the SMTC (operation 704). That is, the base station may enumerate the length (MGL) and position (gapOffset) of the measurement gap that can be configured through comparison between SMTC information and the MGL. When the measurement gap covers the SMTC, the base station may determine whether the RF tuning time of the UE is insufficient (operation 705). When the measurement gap covers the SMTC, if the RF tuning time of the UE is not sufficiently included, the base station may consider configuring an MGTA (operation 706). Here, the MGTA may be configured to 0.25 or 0.5. Further, when the measurement gap covers the SMTC, if the RF tuning time of the UE is sufficiently included, the MGTA may be not configured (operation 707). For example, when it is necessary for the UE to measure a frequency band different from the frequency band being servicing the UE, an RF tuning time is required, and thus some of the SMTC duration may be not measured. The base station can configure an MGTA if necessary so that there is no performance degradation when the UE performs frequency measurement.

The measurement gap repetition period (MGRP) may be determined in consideration of measured statistics such as a handover or cell change success or failure rate in the corresponding frequency band or a message transmission and reception delay time due to the mobility of the UE (operation 708). For example, if the handover or cell change success rate is high or the delay time during movement is short, the base station may set the MGRP to a longer value to minimize the data transmission/reception disconnection section due to the measurement gap (operation 710). Here, a longer value of the MGRP may be 80 ms or 160 ms. On the contrary, if the handover or cell change success rate is low or a large delay time occurs during movement, the base station may determine that it is important to increase the frequency measurement accuracy by setting the MGRP to a shorter value (operation 709). Here, a shorter value of the MGRP may be 20 ms or 40 ms.

When the MGRP to be set in the corresponding frequency band is compared with the serving cell band frequency of the UE, if the SMTC and the MGRP fully overlap, the base station may set gap sharing parameters (operation 711). For example, if the SMTC of the UE's serving frequency band fully overlaps with the MGRP for measuring another band, the UE measures only one of the two frequency bands and there is no reference for simultaneous observation. In this case, the base station may set a gap sharing configuration with a high proportion on the frequency band to be measured more accurately (operation 712). If another frequency band is to be measured more accurately, the base station may set a configuration so as to lower the share ratio of the measurement section of the serving frequency band and increase the share ratio of the other frequency band (operation 713). Here, the gap sharing configuration may be not applied. Through the above operations, the base station can determine the measurement gap related parameters (operation 714).

For example, the base station may configure a gap sharing ratio value to the UE when the SMTC of the serving cell and the measurement gap for inter-frequency or inter-RAT measurement fully overlap, or when the measurement gap for intra-frequency measurement and the measurement gap for inter-frequency or inter-RAT measurement fully overlap. Because there is a trade-off relationship between the RLM/RRM performance of the serving cell (or intra-frequency neighbor) and the RRM performance of the neighbor cell according to the set gap sharing ratio, the base station may utilize this value according to mobility environments. For example, when the UE performs intra-frequency measurement and inter-frequency or inter-RAT measurement at the same time, if the base station wants a specific UE to perform intra-frequency measurement more accurately, the base station may deliver a high gap sharing ratio to the UE. This operation can be considered when the base station wants to know a more accurate measurement report value about the same frequency as the serving cell. On the contrary, when the base station wants a specific UE to perform inter-frequency or inter-RAT measurement more accurately, the base station may deliver a low gap sharing ratio to the UE. This operation can be considered when the base station wants to know a more accurate measurement report value about a frequency or RAT different from the serving cell. That is, the gap sharing operation can be applied differently according to the characteristics of the network in which a cell is additionally installed and the characteristics of the UE.

Figure 8A:
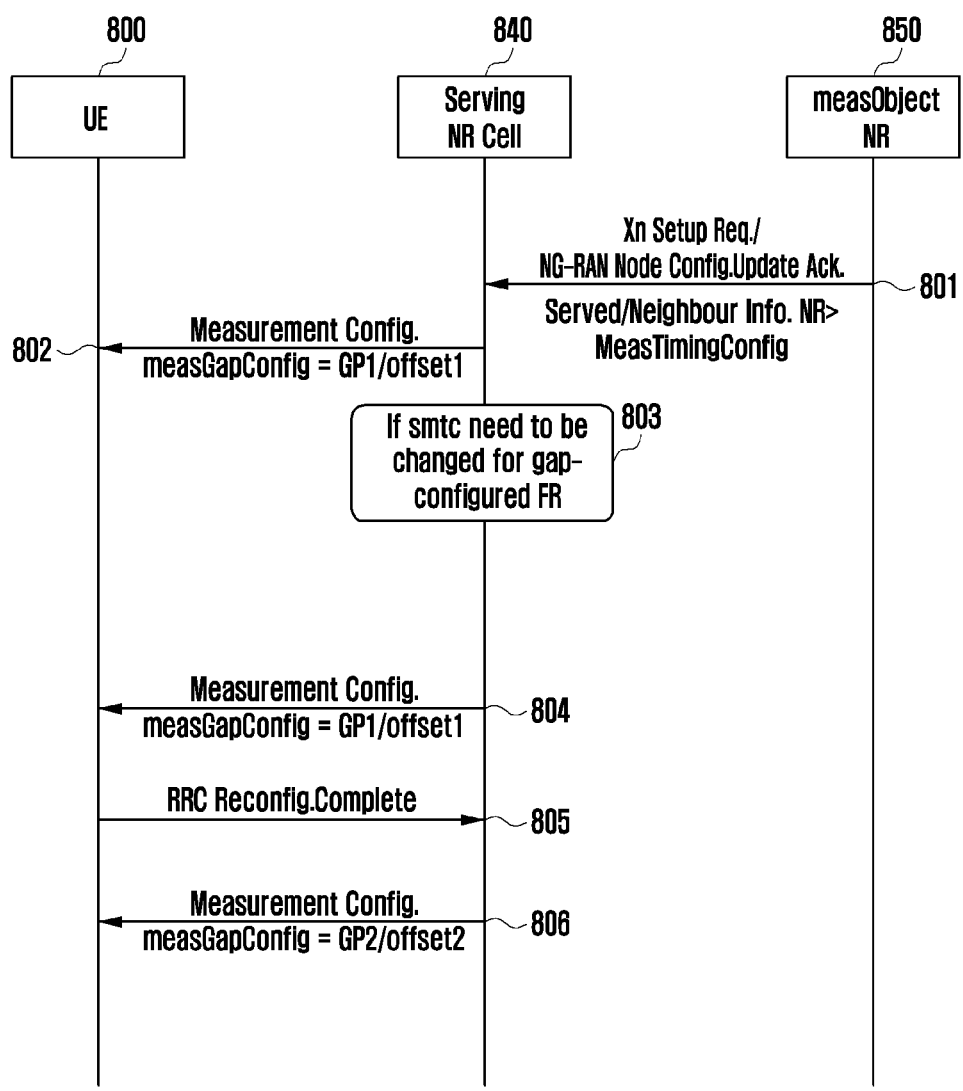
FIG. 8A is a diagram illustrating a UE configuration procedure for 5G frequency measurement between the base station and the UE after generation of the RRM management table.
Figure 8B:
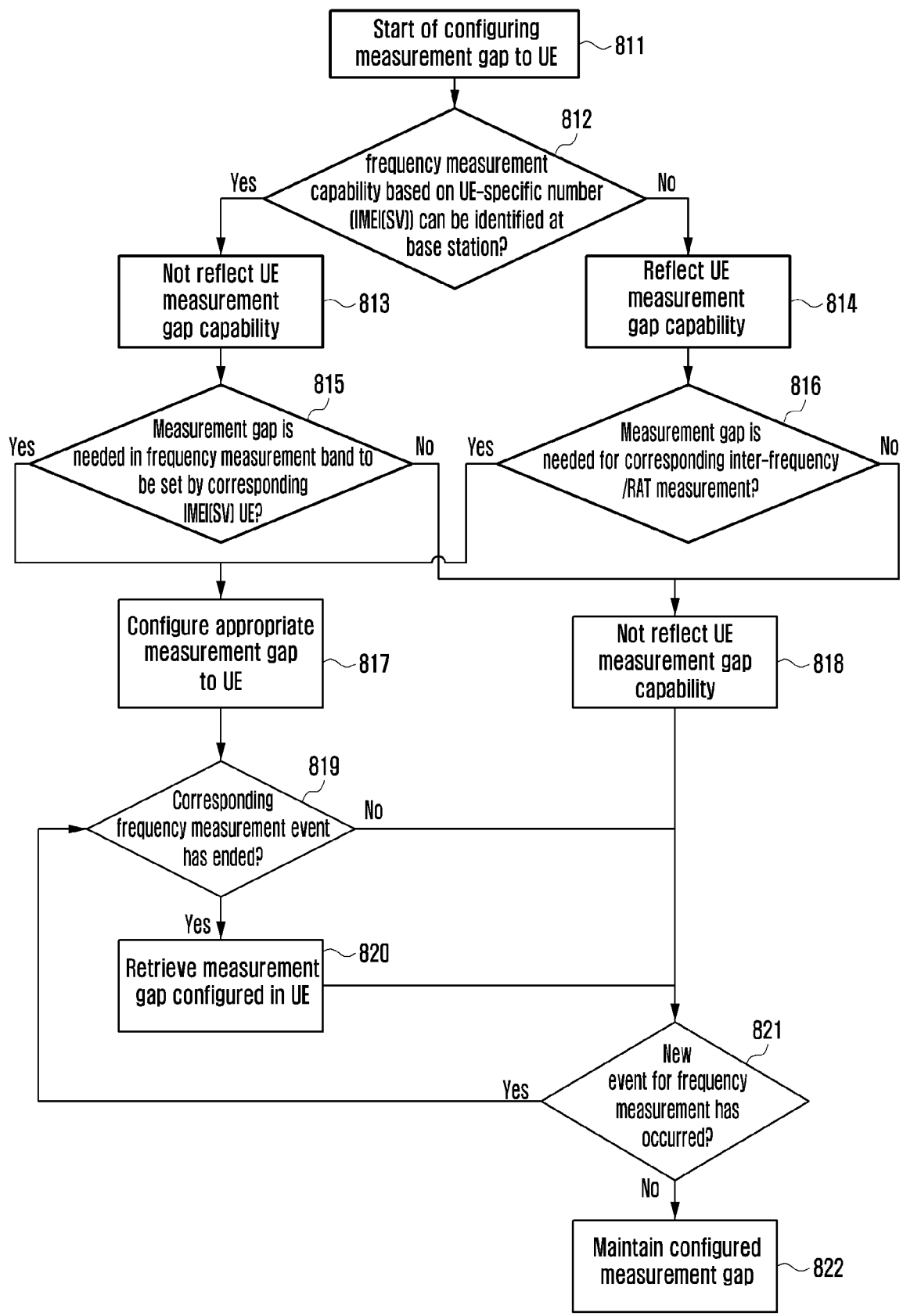
FIG. 8B is a diagram illustrating an operation for configuring a frequency measurement gap in the UE after generation of the RRM management table.

FIG. 8A is a diagram illustrating a UE configuration procedure for 5G frequency measurement between the base station and the UE after generation of the RRM management table. Further, FIG. 8B is a diagram illustrating an operation for configuring a frequency measurement gap in the UE after generation of the RRM management table.

If there are plural measurement objects 880 to be configured to the UE 800 and a measurement gap should be accompanied, the measurement gap to be configured is equally applied to all or some of the serving cells 840 according to the capability of the UE, and scheduling constraints must be applied. When there are plural measurement gap types to be configured by the base station, the operations of FIG. 8A include an operation of configuring or releasing a measurement gap in sequence or in parallel. The operations of FIG. 8A are basically performed based on the measurement gap capability of the UE, and work differently for the per-UE gap and the per-FR gap. If the base station can identify the per-UE capability indicating whether or not a measurement gap is required for each 5G frequency combination, it may omit configuring a measurement gap for a UE not requiring a measurement gap.

First, when there are plural measurement objects 880 and a measurement gap should be accompanied, that is, when there are plural measurement gap types to be configured by the serving cell 840, the measurement object 880 may transmit information requesting Xn setup and RAN node configuration update ACK to the serving cell 840 (operation 801). Further, information about the cell may be included, and specifically, configuration information regarding the measurement timing may be included. Thereafter, the serving cell 840 may transmit first measurement configuration information to the UE 800 (operation 802).

After the serving cell 840 transmits the first measurement configuration information to the UE 800, the SMTC of the serving cell 840 may be required to change the gap set in the corresponding frequency range (operation 803). If there is such a change request, the serving cell 840 may transmit the first measurement configuration information to the UE 800 again (operation 804). In response to the transmission, the UE 800 may transmit an RRC reconfiguration complete message to the serving cell 840 (operation 805). Upon receiving the RRC reconfiguration complete message, the serving cell 840 may transmit second measurement configuration information to the UE 800 (operation 806).

As another example, when the measurement gap is configured in the MCG, the SCG can receive gap configuration information from the MCG and apply it to the scheduling constraints. The MCG may consider configuring a plurality of measurement gaps according to the types of frequencies to be measured, and may perform delta signaling to share the gap configuration information over X2. For example, while the DU scheduler is applying scheduling constraints to the corresponding UE due to already set measurement gap A, when the CU additionally delivers measurement gap B having been received over X2 or configured by the CU itself, the DU scheduler may apply a scheduling constraint considering measurement gaps A and B at the same time. This scheduling constraint can be canceled when the DU receives a release indication for a specific measurement gap from the CU.

With reference to FIG. 8B, the base station may start to configure a measurement gap to the UE (operation 811). The base station may determine whether the frequency measurement capability can be distinguished by using an international mobile station equipment identity software version (IMEISV) value received from another base station or the core (e.g., MME or AMF) (operation 812). At this time, if the base station determines that the frequency capability of the UE can be distinguished according to the IMEISV, the measurement gap capability of the UE may be not reflected (operation 813). However, if the base station determines that the frequency capability of the UE cannot be distinguished according to the IMEISV, the measurement gap capability of the UE is reflected (operation 814). Here, it is possible to omit for a specific terminal in which capability transmission is impossible or the terminal does not need the measurement gap in implementation.

Further, if the measurement gap capability of the UE is not reflected, the base station may determine whether a measurement gap is required in the frequency measurement band to be configured by the corresponding IMEISV UE (operation 815). On the contrary, if the measurement gap capability of the UE is reflected, the base station may determine whether a measurement gap is required for the corresponding inter-frequency or inter-RAT measurement (operation 816). If a measurement gap is required at operation 815 or operation 816, the UE may configure an appropriate measurement gap (operation 817). In addition, if a measurement gap is not required at operation 815 or operation 816, the UE measurement gap capability is not reflected (operation 818). If an appropriate measurement gap is configured in the UE, whether the frequency measurement event has ended may be determined (operation 819). Then, if the event has ended, the measurement gap configured in the UE may be retrieved (operation 820). However, if the frequency measurement event has not ended or an appropriate measurement gap is not configured in the UE, the configured measurement gap can be maintained until a new frequency measurement event occurs (operation 822). But, when a new frequency measurement event occurs, operation 819 may be performed.

In particular, the introduction of NSA in the 5G system is based on dual connectivity technology between LTE and NR. This can be extended to dual connectivity between NR and NR, and a situation in which TDD frame timing is to be applied differently may be considered to avoid interference between adjacent bands, between base stations, or between UEs. A description will be given below of an operation to prevent an error in transmitting 5G frequency measurement information when the TDD frame timing is different. The operation for SFTD analysis can be commonly reflected not only in 5G frequency measurement but also in an operation to match the timing between two systems in dual connectivity. For example, when resource information is shared and coordinated over the X2 or Xn interface, the timing difference can be reflected. As another example, the timing difference may be reflected when it is necessary to increase the power consumption efficiency of a UE by aligning the DRX timings of the UE operating between two systems.

When multi-RAT dual connectivity defined by 3GPP is supported, frame timing offsets between the MCG and the SCG may be different. For example, the master node may set the SFN/frame timing to +0 ms relative to the GPS absolute time, and the secondary node may set the SFN/frame timing to +3 ms relative to the GPS absolute time. In this case, a difference occurs in the slot index that the UE recognizes when receiving the MCG and SCG frames. When the UE has an SFTD reporting capability, the UE may measure the SFN and frame timing difference and report it to the base station, and the base station may determine how much SFTD is being applied in the dual connectivity system by reflecting the reported value from the UE and the TA. The base station can manage in advance SFTD values existing in individual neighbor cells or individual base stations in a table form. For example, the SFTD may be separately managed by adding a PCID to the management table for RRM. The SFTD can be used by subtracting the difference between cells by managing the frame start timing offset applied to each cell, or may be managed by calculating in advance difference values between cells or between base stations.

TABLE 5

Illustration of RRM management table method when SFTD between base stations or cells exists

| Freq. Range, SSB SCS | Max. SSB Length | SMTC Length | Feasible GP, Offsets | ... | PCID | Frame timing offset |
|---|---|---|---|---|---|---|
| B6G(<3 GHz) (15k SCS) | 2 ms (4 SSBs in 2 slots) | 2 sf | GP 2, 3, 10, 11 | ... | 1 | 0 (matched with GPS absolute time) |
| B6G(<3 GHz) (30k SCS) | 1 ms (4 SSBs in 2 slots) | 1 sf | GP 2, 3, 10, 11 | ... | 2 | 1.94 ms |

Figure 9A:
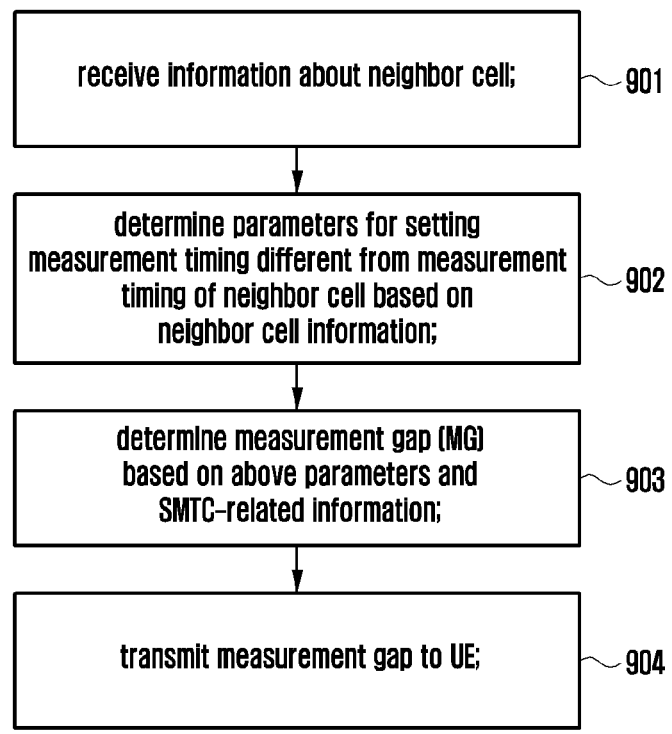
FIG. 9A is a diagram illustrating an embodiment of the disclosure.

FIG. 9A is a diagram illustrating an embodiment of the disclosure.

With reference to FIG. 9A, the base station may receive information about another neighbor cell (operation 901). The base station may determine parameters for setting a measurement timing different from the measurement timing of the neighbor cell based on the neighbor cell information (operation 902). The parameters may include at least one of SSB subcarrier spacing (SCS), SSB number, SSB frequency, or SSB location. Then, information related to the SS/PBCH block measurement timing configuration (SMTC) may be obtained based on the above parameters and information for frequency measurement. The information for frequency measurement may be managed in the form of a table such as the above table, and may include information about a difference in frame timing. Here, the information about a difference in frame timing may mean the above SFTD. The SMTC-related information may include at least one of maximum SMTC length or slot length actually occupied by an SSB. A measurement gap (MG) may be determined based on the above parameters and the SMTC-related information (operation 903). Determining the measurement gap may be embodied as determining a measurement gap timing advance (MGTA) and determining a gap sharing ratio value. Then, the determined measurement gap may be transmitted to the UE (operation 904).

Figure 9B:
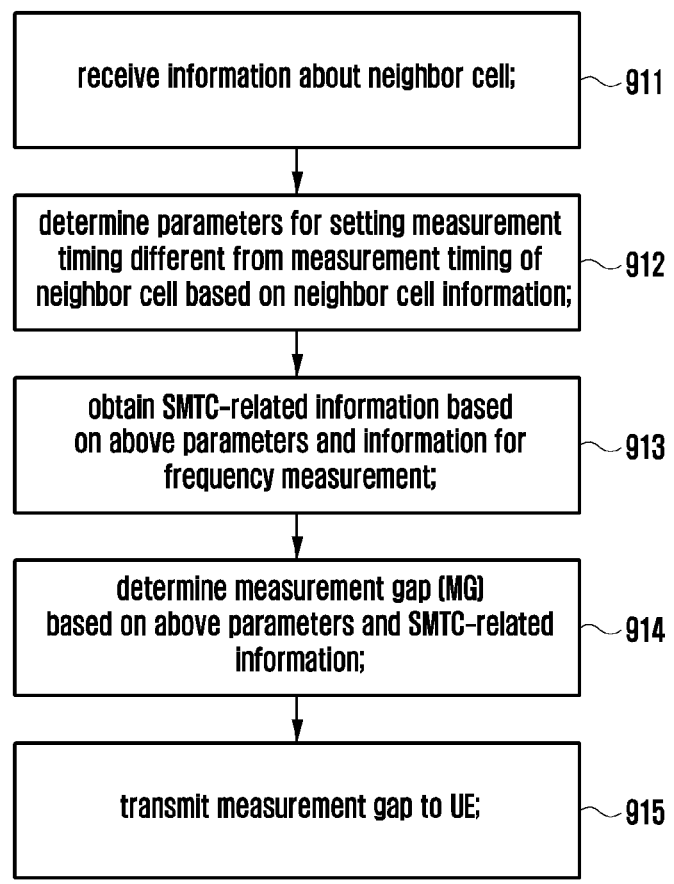
FIG. 9B is a diagram illustrating another embodiment of the disclosure.

FIG. 9B is a diagram illustrating another embodiment of the disclosure.

With reference to FIG. 9B, the base station may receive information about another neighbor cell (operation 911). The base station may determine parameters for setting a measurement timing different from the measurement timing of the neighbor cell based on the neighbor cell information (operation 912). The parameters may include at least one of SSB subcarrier spacing (SCS), SSB number, SSB frequency, or SSB location. Then, information related to the SS/PBCH block measurement timing configuration (SMTC) may be obtained based on the above parameters and information for frequency measurement (operation 913). The information for frequency measurement may be managed in the form of a table such as the above table, and may include information about a difference in frame timing. Here, the information about a difference in frame timing may mean the above SFTD. The SMTC-related information may include at least one of maximum SMTC length or slot length actually occupied by an SSB. A measurement gap (MG) may be determined based on the above parameters and the SMTC-related information (operation 914). Determining the measurement gap may be embodied as determining a measurement gap timing advance (MGTA) and determining a gap sharing ratio value. Then, the determined measurement gap may be transmitted to the UE (operation 915).

Figure 10A:
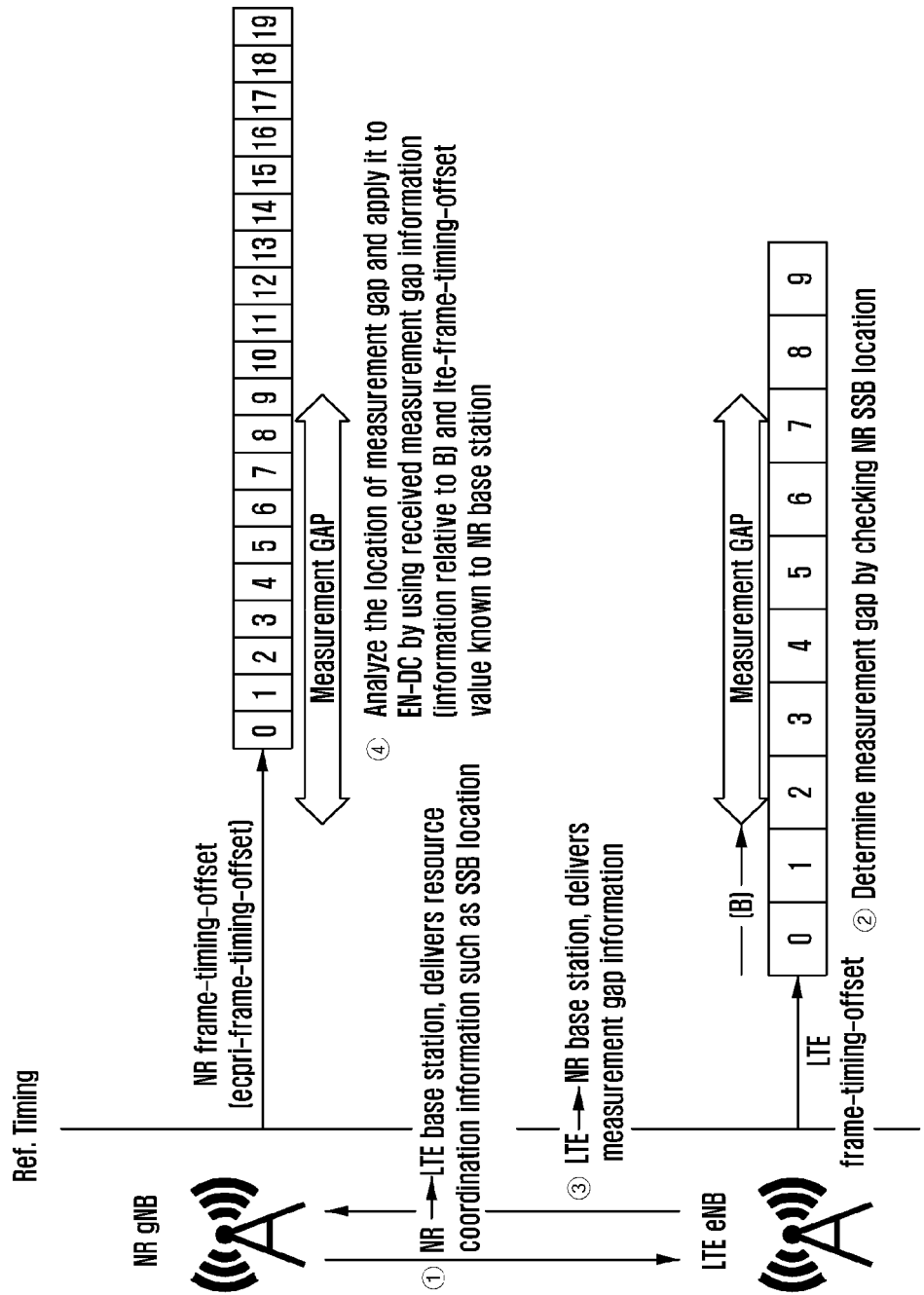
FIG. 10A is a diagram illustrating an example of a measurement gap analysis method in the presence of an SFTD between base stations.

FIG. 10A is a diagram illustrating an example of a measurement gap analysis method in the presence of an SFTD between base stations.

If there is no UE capable of reporting an SFTD in the 5G network, the MCG and the SCG may reflect this. For example, when the MCG receives the SMTC or measurement gap configuration information of the SCG, when the SMTC of a neighbor cell is transmitted, or when the MCG and the SCG share resource information over X2 for scheduling cooperation, if the SFTD value is not known or not accurately reflected, the RRM performance of the UE may be deteriorated, or an error may occur in the scheduling operation to thereby reduce the performance.

For example, the NR base station may transmit resource coordination information such as SSB location to the LTE base station. Then, the LTE base station may determine a measurement gap by checking the NR SSB location or the like. Thereafter, the LTE base station may transmit measurement gap information to the NR base station. Upon receiving the measurement gap information, the NR base station may analyze the location of the measurement gap by using the received measurement gap information and the LTE-frame-timing-offset value known to the NR base station, and use it for EN-DC.

Figure 10B:
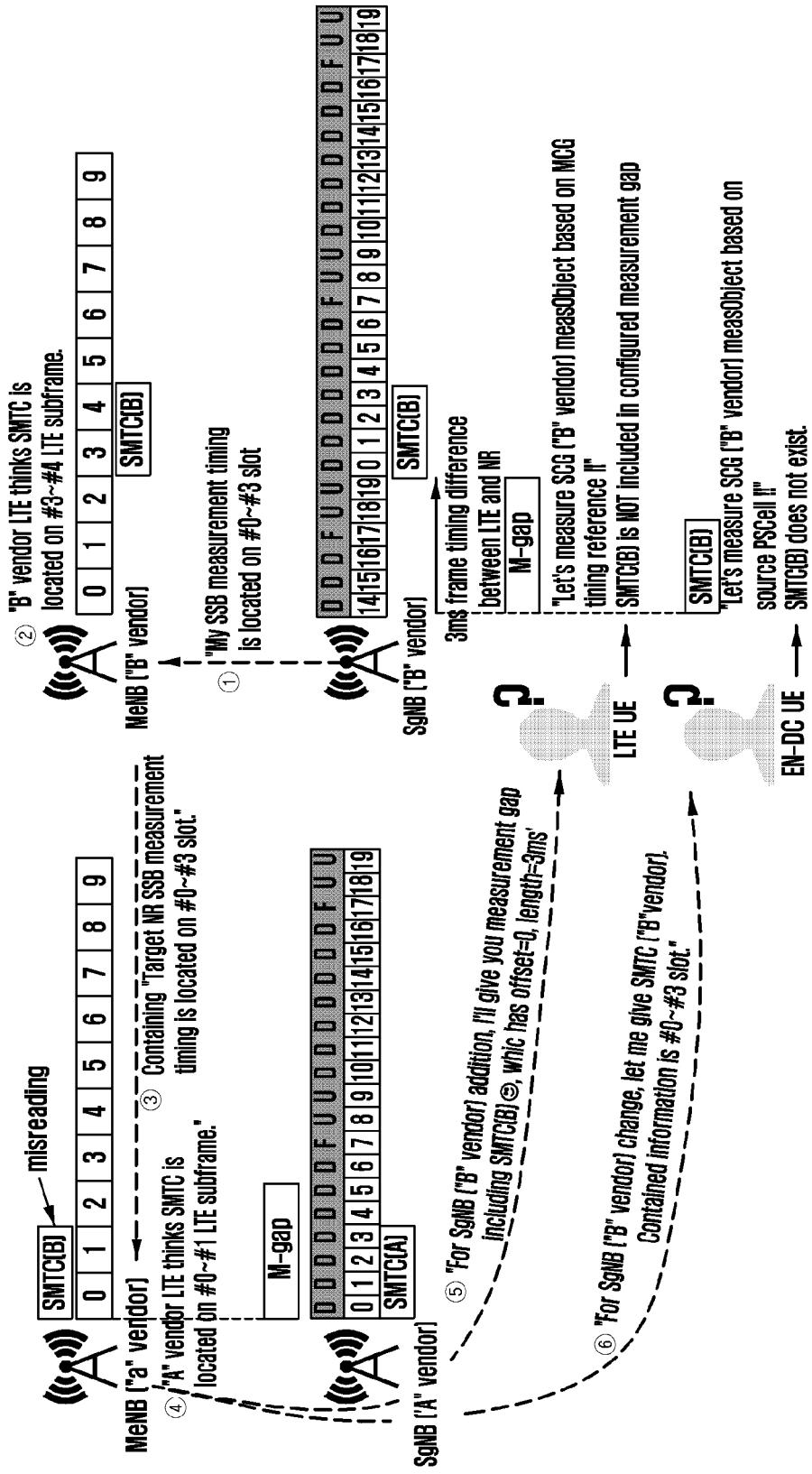
FIG. 10B is a diagram illustrating an example of a procedure for correcting not only measurement but also various dual-connectivity by using an SFTD value.

FIG. 10B is a diagram illustrating an example of a procedure for correcting not only measurement but also various dual-connectivity by using an SFTD value.

For example, when the start timing known to a first base station is N and the start timing known to a second base station is N−1, a time difference of 1 may occur. In a case where the timing related information set by the first base station needs to be transmitted to the second base station, if N is transmitted, the second base station may determine that the corresponding configuration is a future time point, causing an erroneous operation. For instance, if the SFTD value is managed by the MCG and known in advance, the MCG may reflect the SFTD and transmit the information over X2/Xn/F1 while not transmitting the SFTD value itself.

As another example, the MCG may transmit the original configuration without correcting the SFTD value and transmit the SFTD value itself to the SCG over X2/Xn. In this case, the SCG can perform analysis by using the received information and the SFTD. The agent for correcting the SFTD in the SCG may be the CU having received over X2/Xn or the DU having received over F1.

In addition, the disclosure proposes several options for the method of SFTD sharing.

First, there may be a method in which the base station reflects an SFTD result report value reported from the UE. When the base station instructs the UE to report the SFTD and the UE transmits an SFTD measurement value to the base station, the base station having received the report may share a difference with a neighbor base station or a neighbor cell. In the case of standard-based operation, if the UE does not report a measurement value, an event to be shared may not occur. When the UE is instructed to periodically report a measurement value, the base station may share it only when a different value is reported or may share whenever there is a reported value as another example. In this case, the sharing-receiving base station may determine whether the reported value is the same as the original value.

Further, it is possible to consider a method in which the base station arbitrarily writes an SFTD result value not reported by the UE and reflects it as if reported by the UE. This operation refers to an operation of arbitrarily sharing between base stations by using a standard parameter that transmits a value reported by the UE. It can be used when the UE does not have the capability to report the SFTD. A value not reported by the UE may be shared between base stations through separate negotiations or non-standard interfaces, and it may be determined and transmitted via a standard parameter. Although this value can be periodically transmitted, since the frame start timing is not usually a parameter that can be easily adjusted after additional installation, it can be transmitted on an event basis only when a change in frame timing in a cell or base station is detected.

In addition, it is possible to consider a method in which the base station manually inputs SFTD information from either the MCG or the SCG and manages the same. This operation refers to a method in which the base station or management server on one side manages a frame timing difference value with neighbor base stations that can be connected through dual connectivity without using a standard parameter. The standard parameter is originally used for the report value of the UE; since the standard does not specify what action to be taken when the corresponding value is received, even if the value is shared, measurement gap analysis as shown above cannot be guaranteed. To prevent such an erroneous operation, one of the master base station and the secondary base station as an agent may play a role of correcting all parameters affected when the frame timing between cells or between base stations is different. In this case, the SFTD between the MCG and the SCG in dual connectivity can be managed in advance in a similar way to Table 5 above.

Finally, it is possible to consider a method in which the base station manually inputs the frame start timing of the MCG and the frame start timing of the SCG as a per-cell parameter and the MCG or SCG directly calculates the difference value and reflects the same. Although being similar to the above method of arbitrarily writing an SFTD result value not reported by the UE and reflecting it as if reported by the UE, this operation means a method of managing the timing difference. When a few types of timing differences are operated, it may be simpler to manage only combinations between cells according to several types of differences rather than managing all timing parameters for each cell.

The SFTD value managed or obtained by the above method can be used for correction when the SMTC is shared between cells, measGapConfig is shared, DRX config is shared, or resource information available or unavailable for interference avoidance or joint scheduling is shared.

Figure 11A:
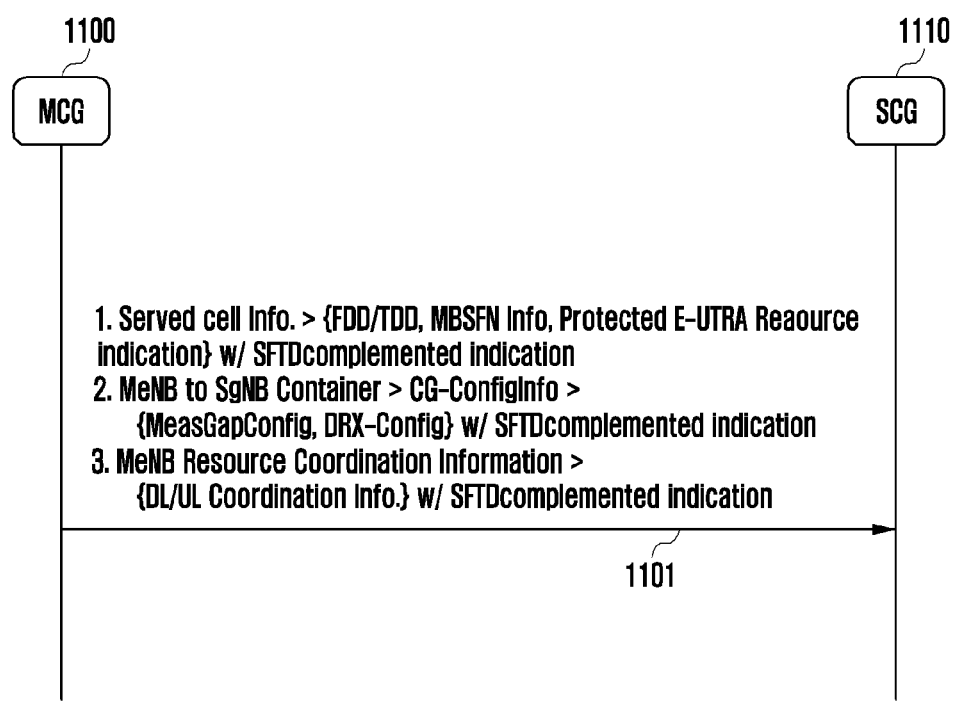
FIG. 11A is a diagram illustrating a correction parameter transmission scheme when the SFTD management agent in dual connectivity is determined to be the MCG.

FIG. 11A is a diagram illustrating a correction parameter transmission scheme when the SFTD management agent in dual connectivity is determined to be the MCG.

With reference to FIG. 11A, if there is a non-zero SFTD between cell groups in MR-DC including EN-DC, NE-DC or NR-DC, the MCG 1100 may adjust and correct timing-related X2/Xn parameters, such as SSB measurement timing, measurement gap configuration, DRX configuration, and DL/UL resource coordination information. When the timing related X2/Xn parameters need to be corrected, the MCG 1100 may transmit them by including information indicating the correction performed by the MCG 1100 to the SCG 1110 (operation 1101). Here, the information indicating the correction may be an indicator indicating a 1-bit addition mark. The indicator may be "SFTDcomplemented" indication.

Figure 11B:
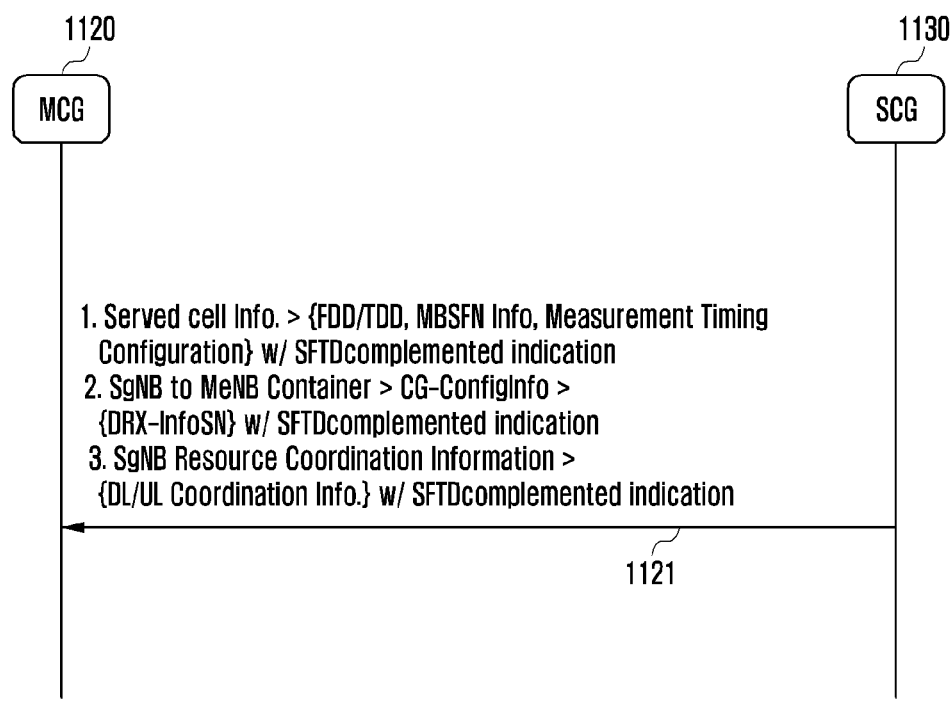
FIG. 11B is a diagram illustrating a correction parameter transmission scheme when the SFTD management agent in dual connectivity is determined to be the SCG.

Further, FIG. 11B is a diagram illustrating a correction parameter transmission scheme when the SFTD management agent in dual connectivity is determined to be the SCG.

With reference to FIG. 11B, if there is a non-zero SFTD between cell groups in MR-DC including EN-DC, NE-DC or NR-DC, the SCG 1130 may adjust and correct timing-related X2/Xn parameters, such as SSB measurement timing, measurement gap configuration, DRX configuration, and DL/UL resource coordination information. When the timing related X2/Xn parameters need to be corrected, the SCG 1130 may transmit them by including information indicating the correction performed by the SCG 1130 to the MCG 1120 (operation 1121). Here, the information indicating the correction may be an indicator indicating a 1-bit addition mark. The indicator may be "SFTDcomplemented" indication.

FIGS. 12A to 12D are diagrams illustrating a correction parameter transmission scheme when the SFTD management agent in dual connectivity is not determined.

Figure 12A:
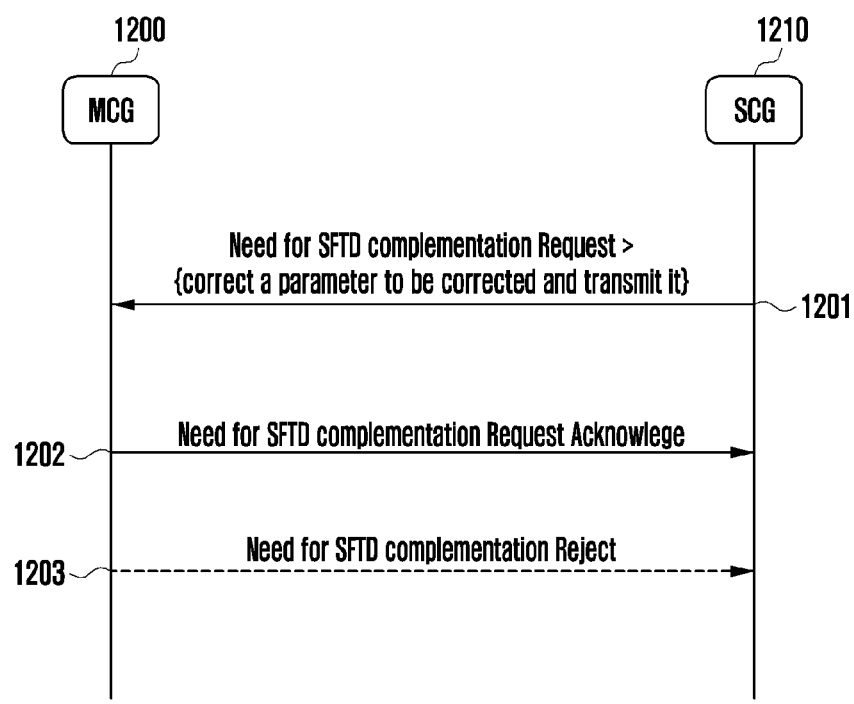
FIG. 12A is a diagram illustrating a case in which the MCG accepts or rejects a value transmitted after being corrected by the SCG.

Specifically, FIG. 12A is a diagram illustrating a case in which the MCG accepts or rejects a value transmitted after being corrected by the SCG.

With reference to FIG. 12A, the SCG 1210 may correct a parameter to be corrected and transmit it to the MCG 1200 (operation 1201). In response, the MCG 1200 may transmit an ACK for transmission of the corrected parameter to the SCG 1210 (operation 1202). In this case, only when the parameter value transmitted after being corrected is rejected by the MCG 1200, the MCG 1200 may transmit a rejection message to the SCG 1210 (operation 1203).

Figure 12B:
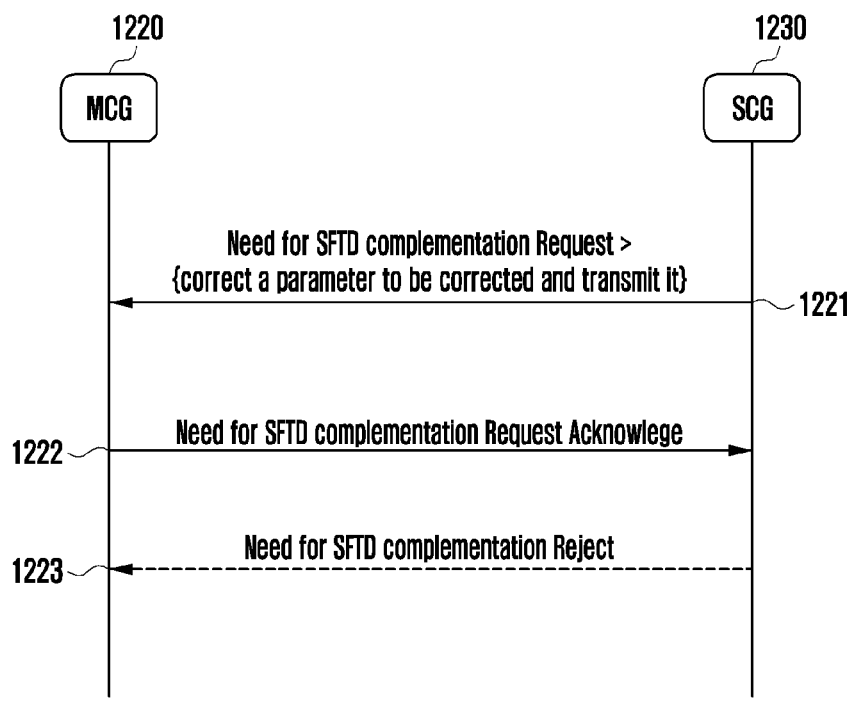
FIG. 12B is a diagram illustrating a case in which the SCG accepts or rejects a value transmitted after being corrected by the MCG.

FIG. 12B is a diagram illustrating a case in which the SCG accepts or rejects a value transmitted after being corrected by the MCG.

With reference to FIG. 12B, the MCG 1220 may correct a parameter to be corrected and transmit it to the SCG 1230 (operation 1221). In response, the SCG 1230 may transmit an ACK for transmission of the corrected parameter to the MCG 1220 (operation 1222). Only when the parameter value transmitted after being corrected is rejected by the SCG 1230, the SCG 1230 may transmit a rejection message to the MCG 1220 (operation 1223).

Figure 12C:
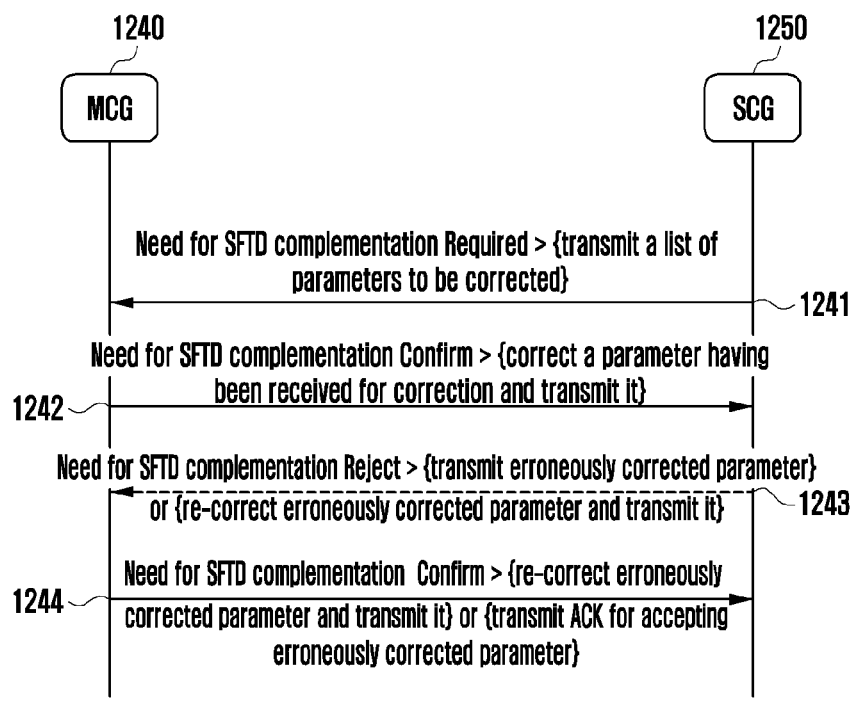
FIG. 12C is a diagram illustrating a case in which the MCG corrects and transmits a value that has been indicated by the SCG as requiring correction (can be rejected if the value is incorrect).

FIG. 12C is a diagram illustrating a case in which the MCG corrects and transmits a value that has been indicated by the SCG as requiring correction (can be rejected if the value is incorrect).

With reference to FIG. 12C, the SCG 1250 may transmit a list of parameters to be corrected to the MCG 1240 (operation 1241). In response, the MCG 1240 may correct a parameter having been received for correction and transmit it to the SCG 1250 (operation 1242). If the correction is rejected, the SCG 1250 may transmit the erroneously corrected parameter to the MCG 1240 or may correct the erroneously corrected parameter again and transmit it to the MCG 1240 (operation 1243). In this case, the MCG 1240 may correct the erroneously corrected parameter again and transmit it or may transmit an ACK for the re-corrected parameter (operation 1244).

Figure 12D:
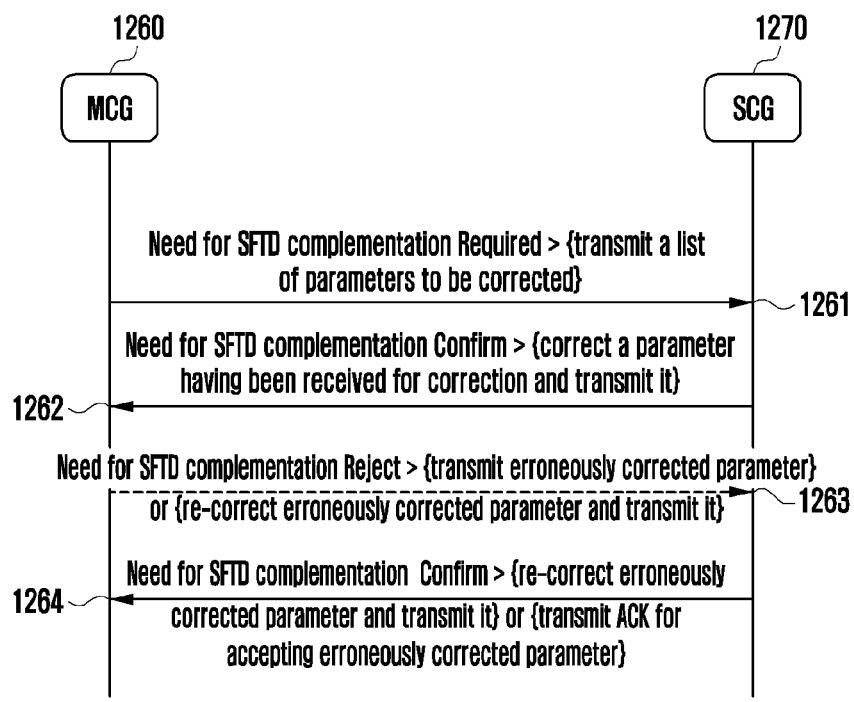
FIG. 12D is a diagram illustrating a case in which the SCG corrects and transmits a value that has been indicated by the MCG as requiring correction (can be rejected if the value is incorrect).

FIG. 12D is a diagram illustrating a case in which the SCG corrects and transmits a value that has been indicated by the MCG as requiring correction (can be rejected if the value is incorrect).

With reference to FIG. 12D, the MCG 1260 may transmit a list of parameters to be corrected to the SCG 1270 (operation 1261). In response, the SCG 1270 may correct a parameter having been received for correction and transmit it to the MCG 1260 (operation 1262). If the correction is rejected, the MCG 1260 may transmit the erroneously corrected parameter to the SCG 1270 or may correct the erroneously corrected parameter again and transmit it to the SCG 1270 (operation 1263). In this case, the SCG 1270 may correct the erroneously corrected parameter again and transmit it or may transmit an ACK for the re-corrected parameter (operation 1264).

Figure 13:
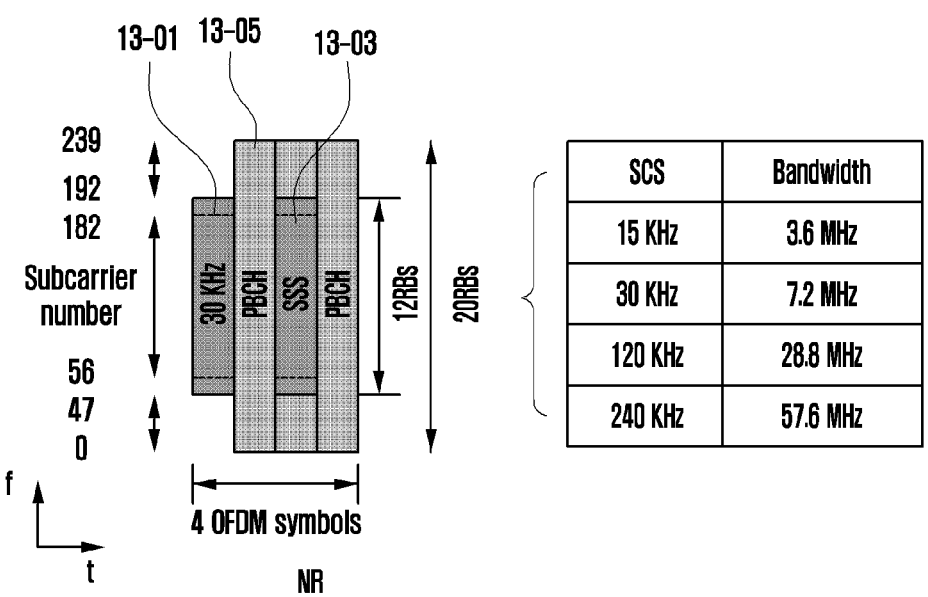
FIG. 13 is a diagram illustrating a state in which a synchronization signal and a physical broadcast channel (PBCH) are mapped to the frequency-time domain in the NR system.

FIG. 13 is a diagram illustrating a state in which a synchronization signal and a physical broadcast channel (PBCH) are mapped to the frequency-time domain in the NR system.

A primary synchronization signal (PSS) 13-01, a secondary synchronization signal (SSS) 13-03, and a PBCH are mapped over 4 OFDM symbols, and the PSS and the SSS are mapped to 12 RBs and the PBCH is mapped to 20 RBs. How the frequency band of 20 RBs changes according to the subcarrier spacing (SCS) is shown in the table of FIG. 13. The resource region in which the PSS, SSS, and PBCH are transmitted may be referred to as an SS/PBCH block. Further, the SS/PBCH block may be referred to as an SSB block.

Figure 14:
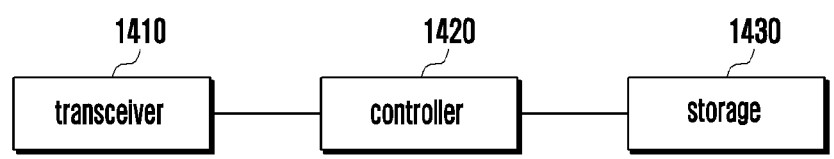
FIG. 14 is a diagram illustrating the structure of a UE according to an embodiment of the disclosure.

FIG. 14 is a diagram illustrating the structure of a UE according to an embodiment of the disclosure.

With reference to FIG. 14, the UE may include a transceiver 1410, a controller 1420, and a storage 1430. In the disclosure, the controller may be defined as a circuit, an application specific integrated circuit, or at least one processor.

The transceiver 1410 may transmit and receive signals to and from other network entities. The transceiver 1410 may receive system information from, for example, a base station, and may receive a synchronization signal or a reference signal.

The controller 1420 may control the overall operation of the UE according to embodiments proposed in the disclosure. For example, the controller 1420 may control signal flows between blocks to perform operations according to the flowchart described above. Specifically, the controller 1420 may control operations proposed in the disclosure to receive remaining minimum system information (RMSI) in a multi-beam based system according to an embodiment of the disclosure.

The storage 1430 may store at least one of information transmitted and received through the transceiver 1410 or information generated through the controller 1420. For example, the storage 1430 may store scheduling information related to RMSI transmission, PDCCH time axis location and periodicity information related to RMSI, and the like.

Figure 15:
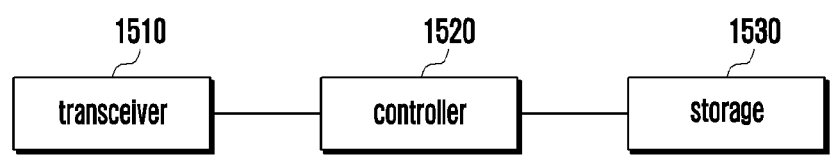
FIG. 15 is a diagram illustrating the structure of a base station according to an embodiment of the disclosure.

FIG. 15 is a diagram illustrating the structure of a base station according to an embodiment of the disclosure.

With reference to FIG. 15, the base station may include a transceiver 1510, a controller 1520, and a storage 1530. In the disclosure, the controller may be defined as a circuit, an application specific integrated circuit, or at least one processor.

The transceiver 1510 may transmit and receive signals to and from other network entities. The transceiver 1510 may transmit system information to, for example, a UE, and may transmit a synchronization signal or a reference signal.

The controller 1520 may control the overall operation of the base station according to embodiments proposed in the disclosure. For example, the controller 1520 may control signal flows between blocks to perform operations according to the flowchart described above. Specifically, the controller 1520 may control operations proposed in the disclosure to transmit remaining minimum system information (RMSI) in a multi-beam based system according to an embodiment of the disclosure.

The storage 1530 may store at least one of information transmitted and received through the transceiver 1510 or information generated through the controller 1520. For example, the storage 1530 may store scheduling information related to RMSI transmission, PDCCH time axis location and periodicity information related to RMSI, and the like.

Further, the embodiments disclosed in the present specification and drawings are provided as specific examples to easily describe the contents of the disclosure and help understanding, and are not intended to limit the scope of the disclosure. Therefore, the scope of the disclosure should be construed to include not only the embodiments disclosed herein but also all changes or modifications derived based on the technical characteristics of the disclosure.

The invention claimed is:

1. A method performed by a base station, the method comprising:
receiving information on a neighbor cell;
determining parameters for setting a measurement timing different from a measurement timing of the neighbor cell based on the information on the neighbor cell, wherein the parameters include at least one of a synchronization signal/physical broadcast channel (SS/PBCH) block (SSB) subcarrier spacing (SCS), an SSB number, an SSB frequency, or an SSB location;
obtaining SSB measurement timing configuration (SMTC)-related information based on the parameters and information on frequency measurement, wherein the information on frequency measurement is managed in a table and wherein the SMTC-related information includes at least one of maximum SMTC length or slot length actually occupied by an SSB;
determining a measurement gap (MG) based on the parameters and the SMTC-related information; and
transmitting, to a terminal, the measurement gap.

2. The method of claim 1, further comprising:
receiving, from the terminal, information on a difference in frame timing; and
correcting timing-related information between different base stations by using the information on the difference in frame timing,
wherein the information on frequency measurement includes the information on the difference in frame timing.

3. The method of claim 1, wherein determining a measurement gap comprises:
determining a measurement gap timing advance (MGTA); and
determining a gap sharing ratio value.

4. The method of claim 1, comprising, in case that there is a change in the SMTC-related information:
determining a measurement gap based on the determined parameters and the changed SMTC-related information; and
transmitting, to the terminal, the determined measurement gap.

5. The method of claim 1, further comprising identifying a measurement gap capability of the terminal, and wherein the measurement gap is determined based on the measurement gap capability.

6. A method performed by a terminal, the method comprising:
measuring information on a difference in frame timing between a plurality of base stations;
transmitting, to a base station, the information on the difference in frame timing; and
receiving, from the base station, a measurement gap (MG),
wherein the measurement gap is determined based on parameters for configuring a measurement timing different from that of a neighbor cell based on information received from the neighbor cell, and synchronization signal/physical broadcast channel (SS/PBCH) block (SSB) measurement timing configuration (SMTC)-related information, and wherein the parameters include at least one of an SSB subcarrier spacing (SCS), an SSB number, an SSB frequency, or an SSB location,
wherein:
the SMTC-related information is obtained based on the parameters and information on frequency measurement,
the information on frequency measurement is managed in a table, and
the information on frequency measurement includes the information on the difference in frame timing.

7. A base station comprising:
a transceiver capable of transmitting and receiving at least one signal; and
a controller coupled to the transceiver, wherein the controller is configured to:
receive information on a neighbor cell,
determine parameters for setting a measurement timing different from a measurement timing of the neighbor cell based on the information on the neighbor cell,
wherein the parameters include at least one of a synchronization signal/physical broadcast channel (SS/PBCH) block (SSB) subcarrier spacing (SCS), an SSB number, an SSB frequency, or an SSB location,
obtain SSB measurement timing configuration (SMTC)-related information based on the parameters and information on frequency measurement, wherein the information on frequency measurement is managed in a table and wherein the SMTC-related information includes at least one of maximum SMTC length or slot length actually occupied by an SSB,
determine a measurement gap (MG) based on the parameters and synchronization signal/physical broadcast channel (SS/PBCH) block measurement timing configuration (SMTC)-related information, and transmit, to a terminal, the measurement gap.

8. The base station of claim 7, wherein:

the controller is further configured to receive, from the terminal, information on a difference in frame timing, and correct timing-related information between different base stations by using the information on the difference in frame timing; and the information on frequency measurement includes the information about the difference in frame timing.

9. The base station of claim 7, wherein the controller is configured to determine a measurement gap timing advance (MGTA), and determine a gap sharing ratio value.

10. The base station of claim 7, wherein in case that there is a change in the SMTC-related information, the controller is configured to determine a measurement gap based on the determined parameters and the changed SMTC-related information, and transmit, to the terminal, the determined measurement gap.

11. The base station of claim 7, wherein:

the controller is further configured to identify a measurement gap capability of the terminal; and the measurement gap is determined based on the measurement gap capability.

12. A terminal comprising:

a transceiver capable of transmitting and receiving at least one signal; and a controller coupled to the transceiver, wherein the controller is configured to:

measure information on a difference in frame timing between a plurality of base stations, transmit, to a base station, the information on the difference in frame timing, and receive, from the base station, a measurement gap (MG), wherein the measurement gap is determined based on parameters for configuring a measurement timing different from that of a neighbor cell based on information received from the neighbor cell, and synchronization signal/physical broadcast channel (SS/PBCH) block (SSB) measurement timing configuration (SMTC)-related information, and wherein the parameters include at least one of an SSB subcarrier spacing (SCS), an SSB number, an SSB frequency, or an SSB location, wherein:

the SMTC-related information is obtained based on the parameters and information on frequency measurement, the information on frequency measurement is managed in a table, and the information on frequency measurement includes the information on the difference in frame timing.

* * * * *